US012571105B2

(12) United States Patent
Nielsen et al.

(10) Patent No.: US 12,571,105 B2
(45) Date of Patent: Mar. 10, 2026

(54) METALLIC COATED SUBSTRATES

(71) Applicant: Armadillo Metal Coatings Ltd, Port Talbot (GB)

(72) Inventors: Alex Nielsen, Port Talbot (GB); Geraint Williams, Swansea (GB)

(73) Assignee: Armadillo Metal Coatings Ltd, Port Talbot (GB)

( * ) Notice: Subject to any disclaimer, the term of this patent is extended or adjusted under 35 U.S.C. 154(b) by 709 days.

(21) Appl. No.: 17/772,860

(22) PCT Filed: Oct. 30, 2020

(86) PCT No.: PCT/GB2020/052753

§ 371 (c)(1), (2) Date: Apr. 28, 2022

(87) PCT Pub. No.: WO2021/084271

PCT Pub. Date: May 6, 2021

(65) Prior Publication Data

US 2023/0029350 A1 Jan. 26, 2023

(30) Foreign Application Priority Data

Oct. 31, 2019 (GB) .................................. 1915802.1

(51) Int. Cl.
*C23C 18/34* (2006.01)
*B32B 5/06* (2006.01)
(Continued)

(52) U.S. Cl.
CPC ................ *C23C 18/34* (2013.01); *B32B 5/16* (2013.01); *B32B 15/04* (2013.01); *B32B 15/043* (2013.01);
(Continued)

(58) Field of Classification Search
CPC . C23C 18/34; C23C 18/1633; C23C 18/1637; C23C 18/1662; C23C 18/38; C23C 18/48; C23C 18/54; C23C 30/00; C23C 30/005; C09D 5/082; C25D 3/12; C25D 3/22; C25D 3/38; C25D 3/46; C25D 15/00; C25D 17/16; B82Y 30/00; B82Y 40/00; B32B 5/16; B32B 15/04; B32B 15/043; Y10T 428/12486;
(Continued)

(56) References Cited

U.S. PATENT DOCUMENTS

2011/0297038 A1* 12/2011 Lvov ........................ C09D 7/67 523/466
2012/0235083 A1* 9/2012 Virtanen .................. C09D 7/62 106/287.18

FOREIGN PATENT DOCUMENTS

EP 1 832 629 9/2007
WO WO 2013/083293 6/2013
WO WO 2017/030834 2/2017

OTHER PUBLICATIONS

Elshad Abdullayev et al.: "Clay nonotubes for corrosion inhibitor encapsulation: release control with end stoppers", Journal of Materials Chemistry, vol. 20, No. 32, Jan. 1, 2010.
(Continued)

*Primary Examiner* — Michael E. La Villa
(74) *Attorney, Agent, or Firm* — Woodard, Emhardt, Henry, Reeves & Wagner, LLP

(57) ABSTRACT

The invention relates to metallic substrates surface coated with a coating layer comprising a metal and an additive.

16 Claims, 11 Drawing Sheets

(51) Int. Cl.

| | |
|---|---|
| ***B32B 5/16*** | (2006.01) |
| ***B32B 15/04*** | (2006.01) |
| ***C09D 5/08*** | (2006.01) |
| ***C23C 18/16*** | (2006.01) |
| ***C23C 18/38*** | (2006.01) |
| ***C23C 18/48*** | (2006.01) |
| ***C23C 18/54*** | (2006.01) |
| ***C23C 30/00*** | (2006.01) |
| ***C25D 3/12*** | (2006.01) |
| ***C25D 3/22*** | (2006.01) |
| ***C25D 3/38*** | (2006.01) |
| ***C25D 3/46*** | (2006.01) |
| ***C25D 15/00*** | (2006.01) |
| ***C25D 17/16*** | (2006.01) |
| *B82Y 30/00* | (2011.01) |
| *B82Y 40/00* | (2011.01) |

(52) U.S. Cl.

CPC .......... *C09D 5/082* (2013.01); *C23C 18/1633* (2013.01); *C23C 18/1637* (2013.01); *C23C 18/1662* (2013.01); *C23C 18/38* (2013.01); *C23C 18/48* (2013.01); *C23C 18/54* (2013.01); *C23C 30/00* (2013.01); *C23C 30/005* (2013.01); *C25D 3/12* (2013.01); *C25D 3/22* (2013.01); *C25D 3/38* (2013.01); *C25D 3/46* (2013.01); *C25D 15/00* (2013.01); *C25D 17/16* (2013.01); *B82Y 30/00* (2013.01); *B82Y 40/00* (2013.01); *Y10T 428/12486* (2015.01); *Y10T 428/12493* (2015.01); *Y10T 428/12535* (2015.01); *Y10T 428/12542* (2015.01); *Y10T 428/12597* (2015.01); *Y10T 428/12611* (2015.01); *Y10T 428/12618* (2015.01); *Y10T 428/1266* (2015.01); *Y10T 428/12667* (2015.01); *Y10T 428/12792* (2015.01); *Y10T 428/12799* (2015.01); *Y10T 428/12937* (2015.01); *Y10T 428/12944* (2015.01); *Y10T 428/12993* (2015.01); *Y10T 428/2495* (2015.01); *Y10T 428/24967* (2015.01); *Y10T 428/263* (2015.01); *Y10T 428/264* (2015.01); *Y10T 428/265* (2015.01)

(58) Field of Classification Search

CPC ..... Y10T 428/12493; Y10T 428/12535; Y10T 428/12542; Y10T 428/12556; Y10T 428/12597; Y10T 428/12611; Y10T 428/12618; Y10T 428/1266; Y10T 428/12667; Y10T 428/12792; Y10T 428/12799; Y10T 428/12944; Y10T 428/12937; Y10T 428/12993; Y10T 428/2495; Y10T 428/24967; Y10T 428/263; Y10T 428/264; Y10T 428/265

See application file for complete search history.

(56) References Cited

OTHER PUBLICATIONS

International Search Report and Written Opinion for PCT/GB2020/052753 mailed Apr. 15, 2021.

* cited by examiner

8)

9)

10)

11)

12)

13)

14)

15)

16)

17)

C1)

C2)

18)

19)

S1)

S2)

20)

1)

6)

8)

11)

13)

14)

16)

S1)

S2)

METALLIC COATED SUBSTRATES

FIELD OF THE DISCLOSURE

The present invention relates to substrates plated with a surface coating layer comprising metals and anti-corrosive agents loaded in sealed nanotubes; to plating solutions comprising metal ions and said sealed nanotubes; and to apparatuses and/or processes for plating substrates with said surface coating layer.

BACKGROUND

Corrosion, which can degrade many properties of a material (e.g. appearance, strength and permeability to liquids and/or gases), is a gradual chemical and/or electrochemical process that converts a refined metal into a more chemically stable form (e.g. oxide, hydroxide or sulfoxide) upon exposure to oxidant(s) present in the surrounding environment. Indeed, many metals and alloys corrode merely from exposure to moisture present in air, but corrosion processes can be strongly affected by exposure to certain oxidants. Further, as corrosion is a diffusion-controlled process, it occurs on exposed surfaces. As a result, methods to reduce the activity of exposed surfaces can increase the corrosion resistance of metal substrates. Rusting, i.e. the formation of iron oxides, is the best-known example of corrosion and produces oxide(s) or salt(s) of the original metal resulting in a distinctive orange colouration of the metal. Tarnishing is another well-known example of corrosion, in which the outermost layers of a variety of metals and alloys (e.g. silver, gold, copper, brass, aluminium) undergo a chemical reaction upon exposure to everyday atmospheric conditions resulting in the formation of a thin layer of corrosion known as tarnish. Tarnish typically appears as a dull, grey or black film or coating over metal and, unlike rust, is a self-limiting surface phenomenon (i.e. only the top few layers of the metal react and the layer of tarnish seals and protects the underlying layers from further reaction).

Corrosion is costly to industry; this is supported by a study conducted by the U.S. Federal Highway Administration (FHWA) in 2002, in which it was found that the annual direct cost of corrosion was $276 billion—accounting for ca 3.1% of the Gross Domestic Product (GDP) (1). Unfortunately for most engineering metals, the process of corrosion is thermodynamically favourable and so inhibitory measures must be considered and implemented to control unnecessary losses. Electroplating is often used to metallically coat cheap substrate metal, like mild steel. This can be done to functionalise the surface—controlling thermal, electrical or corrosive properties of the part, while keeping costs down.

Metals such as chromium (Cr), cadmium (Cd), copper (Cu), zinc (Zn), nickel (Ni), tin (Sn), silver (Ag), gold (Au), and alloys thereof can be applied onto metallic surfaces using conventional electroplating and/or electroless plating techniques.

As is readily understood by the skilled person, electroless plating or electroless deposition is an auto-catalytic process wherein a metallic layer is deposited onto a catalytic surface through the reaction of a complex compound and a chemical reduction agent. In particular, and in contrast to electroplating processes, electroless deposition uses only a single electrode and no external source of electric current is required. However, the electroless plating solution must contain a reducing agent so that the electrode reaction has the form:

$$M^{z+} + Red_{solution} \xrightarrow{\text{catalytic surface}} M_{solid} + Oxy_{solution}$$

In principle any hydrogen-based reducing agent can be used in the electroless plating solution, although the redox potential of the reducing half-cell must be high enough to overcome the energy barriers inherent in liquid chemistry. Electroless plating of nickel typically uses hypophosphite as the reducing agent, whereas plating of other metals like silver, gold and/or copper typically use low molecular weight aldehyde reducing agents. Electroless plating may also require, dependent on the nature of the metallic substrate to be plated (e.g. copper or silver), pre-treatment to produce a catalytic surface. In addition, heat is conventionally applied to accelerate the plating process and/or harden the metallic coating.

Also as readily understood by the skilled person, electroplating or electrodeposition is a process that uses an external electric current to reduce dissolved metal cations so that they form a thin coherent metal coating on the surface of the part to be plated, which serves as the cathode of the electrical circuit. In some electroplating techniques, the anode is made of the metal to be plated onto the part. The anode and cathode are immersed in an electrolyte solution containing one or more dissolved metal salts as well as other ions that permit the flow of electricity. A power supply supplies a direct current to the anode, oxidizing the metal atoms that it comprises and allowing them to dissolve in the solution. At the cathode, the dissolved metal ions in the electrolyte solution are reduced at the interface between the solution and the cathode, such that they plate onto the cathode surface. The rate at which the anode is dissolved is equal to the rate at which the cathode is plated and thus the ions in the electrolyte bath are continuously replenished by the anode.

Barrel plating is suitable for plating a high number of small components such as nuts, bolts, screws and coins simultaneously, using electroplating and electroless plating methods. The barrel is typically rotated in the electroplating or electroless plating solution to produce a metallic coating onto the plating material.

Metal plating, by electrodeposition or electroless deposition, may be used to modify the appearance and/or functionalise the surface of a product or part. For example, plating Zn, Cu or Ni on steel to act as a sacrificial anode is often performed to restrict electrochemical degradation.

Cadmium (Cd) and chromium trioxide ($CrO_3$) are currently used by electroplaters due to their ability to provide far more enhanced corrosion coatings when compared to Zn or Cu. Methods of electroplating chromium and cadmium are known in the art and are disclosed for example in patent applications KR101841999 or CN107747111; however, these materials are inherently toxic and carcinogenic. Legislation has been developed by The European chemicals Agency (ECHA) banning or restricting their industrial use (3,4).

Corrosion inhibitors such as benzotriazole (BTA) and its derivatives have been used to protect metals such as copper, zinc, nickel and their alloys (5-11). For example, they have been incorporated into paints or coatings which are deposited onto the substrate by processes such as painting, spraying or dip coating to protect metals; however, especially under harsh environments such as under exposure to sea water, many such coatings are ineffective due to their water solubility (18). New approaches to mitigate corrosion involve using nano-encapsulation of active corrosion inhibitors. Halloysite nanotubes have been studied as carrier and release vehicles for applications including organic paint formulation and electrophoretic deposition-they are a known, cost-effective natural resource (12-18).

Halloysite ($Al_2Si_2O_5(OH)_4 \cdot nH_2O$) is a naturally occurring 2-layered aluminosilicate mineral that forms a hollow, tubular submicron structure. The outer tube holds properties similar to $SiO_2$, while the inner has properties similar to $Al_2O_3$ (18). Halloysite nanotubes typically exhibit the following physical properties: Typical specific surface area=65 $m^2$ g, pore volume~1.25 ml/g, refractive index~1.54 and specific gravity~2.53 g/$cm^3$.

Studies show how alloy plate can be organically coated with a halloysite-inhibitor pigment loaded film, improving corrosion resistance compared to an unloaded film control specimen. Physical damage of the coating will accelerate a corrosive environment. The associated local variation in ionic, or pH condition leads to dissociation of nanotube shelling, enabling the inhibitor to release and protect the metallic region against further corrosive attack. The corrosive environment then subsides, preventing release of unnecessary inhibitor (19,20).

The applicants of the present disclosures have surprisingly found that it is possible to form a corrosion-resistant metallic layer on the surface of a substrate by electroplating or electroless plating using an electroplating or electroless plating solution comprising capped nanotubes with a negative surface charge and loaded with an anti-corrosion agent. The resulting metallic layer is resistant to corrosion, uniform and well adhered onto substrates such as mild steel. The invention also provides methods for producing a corrosion-resistant surface layer on a metal substrate while avoiding use of toxic compounds such as cadmium and chromium. The invention offers environmentally friendly and cost-effective methods to provide corrosion-resistant protective metallic coatings which adhere to the substrate with excellent tensile strength.

SUMMARY OF THE INVENTION

The present invention, in its various aspects, is as set out in the accompanying claims.

According to a first aspect of the invention there is provided a metallic substrate, wherein the surface of the substrate is coated, i.e. plated with a coating/plating layer comprising a metal having dispersed therein a plurality of sealed nanotubes loaded with an anti-corrosion agent.

The terms 'plated' and 'coated' or 'plating layer' and 'coating layer' are in the context of this application interchangeable.

The invention therefore provides a metallic substrate coated with a metal incorporating a corrosion inhibitor. The metallic coating layer may be continuous and cover the whole surface of the substrate. Alternatively, it may cover only a part of the surface of the substrate. The substrate is protected by the coating layer from atmospheric corrosion and also from corrosion by harsh environments, for example sea water.

Preferably, the metal of the metallic coating layer is selected from any metallic element, or combination of metallic elements, found in Group 3 up to and including the metallic elements of Group 14 of the periodic table. In such embodiments, said metallic elements include the d-block elements (i.e. elements found in Groups 3 to 12 of the periodic table, hereinafter referred to as 'transition metals') and post transition metals (i.e. metallic elements found in Group 13 or Group 14 of the periodic table). Preferably, the post transition metal is specifically tin. Preferably, the metal(s) of the metallic coating layer is/are selected from transition metal elements.

Preferably, the metal of said metallic coating layer is not, or does not include, chromium or cadmium.

In preferred embodiments of the invention said metal of the metallic coating layer is selected from the group consisting of copper, zinc, silver, tin, gold, nickel or an alloy comprising one or more thereof. More preferably, said metal is selected from the group consisting of copper, zinc, nickel or silver or an alloy comprising one or more of these. Still more preferably, said metal is selected from the group consisting of copper or zinc or an alloy of copper and/or zinc, for example brass. Most preferably, the metallic coating layer is selected from copper or an alloy thereof.

The coated substrate of the invention may be obtained by an electroplating method or an electroless plating method which is described in greater detail below. It is important that the corrosion inhibitor is encapsulated in the nanotubes because otherwise the presence of the corrosion inhibitor may interfere with the electroplating or electroless plating process and inhibit formation/adhesion of the transition metal surface coating layer.

As set out above, the loaded nanotubes are dispersed in the metallic surface coating layer and preferably they are evenly distributed throughout the surface coating layer.

In a preferred embodiment of the invention said nanotubes are selected from the group consisting of halloysite nanotubes, polymer containers, nanocontainers with polyelectrolyte shell, layered double hydroxides, carbon nanotubes or mesoporous inorganic materials such as silica based mesoporous materials for example MCM-41 or SBA-15.

In a further preferred embodiment of the invention said nanotubes are halloysites.

Halloysite is a naturally occurring two-layered aluminosilicate clay with a hollow tubular structure in the submicrometer range. It has the empirical formula:

$$(Al_2Si_2)_5(OH)_4 \cdot nH_2O)$$

where n is 0-2.

In the present invention, the halloysite is typically a dehydrated halloysite in which n=0.

The outer tube of a halloysite has properties similar to those of $SiO_2$, while the inner tube has properties similar to $Al_2O_3$ (5).

Typically, halloysites are between 0.5-15 μm, more usually 1-15 μm in length and have an internal diameter of about 5-20 nm, more usually about 15 nm and an external diameter of about 10-150 nm, more usually about 50 nm.

The nanotubes may be loaded with any suitable corrosion inhibitor.

As used herein, the terms 'anti-corrosion agent' and 'corrosion inhibitor' may be used interchangeably and refer to any chemical compound that, when applied as a coating to a metal or metal alloy substrate, decreases the corrosion rate of said metal or metal alloy.

In the present specification, references to a nanotube loaded with a corrosion inhibitor refer to nanotubes in which molecules of the corrosion inhibitor are present in the lumen of the nanotube. The loading is preferably as high as possible so that the maximum possible amount of corrosion inhibitor is present in the lumen of the nanotube.

Any suitable corrosion inhibitor may be used and in an embodiment of the invention said corrosion inhibitor is selected from the group consisting of ethynylcarbinol alkoxylates such as Korantin® PM and Korantin® PP, alkyne diols such as Korantin® BH, polyether phosphates such as Korantin® LUB, alkyl phosphates such as Korantin® SMK, N-oleoyl-sarcoside, for example sold as Korantin® TC-SH alkanolamine salts of nitrogenous, organic acids, for example Korantin® MAT, propargylalcohol alkoxylates such as Korantin® PAT, Halox® 520, benzimidazole, 2-mercaptobenzimidazole and 2-mercaptobenzothiazole.

In an alternative embodiment of the invention said anti-corrosion agent is selected from the group consisting of phosphate salts, preferably polyphosphate salts such as a metaphosphate salt; organophosphates, preferably organophosphates of the formula $R—O—PO_3H_2$, wherein $R═C_6$-$C_{10}$ alkyl; organosulfur compounds; poly(3-ammoniumpropylethoxysiloxane) dodecanoate; $(NH_4)_2TiF_6$; sodium poly (methacrylate); salicylaldoxime; triazole derivatives; benzotriazole (BTA) or derivatives thereof; cyanate compounds; and any combination thereof.

In an alternative embodiment of the invention said anti-corrosion agent is selected from the group consisting of phosphate salts, preferably polyphosphate salts such as a metaphosphate salt; organophosphates, preferably organophosphates of the formula $R—O—PO_3H_2$, wherein $R═C_6$-$C_{10}$ alkyl; organosulfur compounds; poly(3-ammoniumpropylethoxysiloxane) dodecanoate; $(NH_4)_2TiF_6$; sodium poly (methacrylate); salicylaldoxime; triazole derivatives; benzotriazole (BTA) or derivatives thereof; and any combination thereof.

As used herein, a polyphosphate salt is any salt comprising a polymeric oxyanion formed from three or more tetrahedral $PO_4$ (phosphate) structural units linked together by sharing oxygen atoms. Preferably, the polyphosphate salt is a hexametaphosphate salt, most preferably sodium hexametaphosphate (SHMP). SHMP comprises a hexamer of composition $(NaPO_3)_6$, the structure of which is shown below:

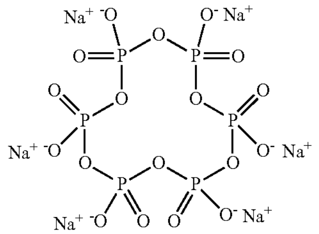

Organosulfur compounds are particularly advantageous for use as anti-tarnish agents in, e.g., gold and/or silver metallic coatings. Preferably, the organosulfur compounds are selected from alkanethiols, alkyl thiolglycolates, dialkyl sulphides, dialkyl disulfides and any combination thereof. Preferred alkanethiols are compounds of the formula $R^1—S—H$. Preferred alkyl thioglycolates are compounds of the formula $R^1—O—C(O)—CH_2—SH$. Preferred dialkyl sulphides are compounds of the formula $R^1—S—R^2$. Preferred dialkyl disulphides are compounds of the formula $R^1—S—S—R^2$. In these preferred organosulfur compounds, $R^1$ and, when present, $R^2$ independently represents an alkyl group and is preferably selected from any $C_1$-$C_{10}$ alkyl group.

As used herein, Salicylaldoxime refers to an organic compound described by the formula $C_7H_7NO_2$, the structure of which is shown below:

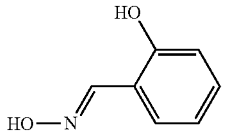

As used herein, a cyanate compound refers to any compound comprising a cyanate ester (i.e. a compound comprising the cyanate group —O—C═N) or any compound or salt comprising the cyanate anion [O═C═N]. As the skilled person would recognise, the cyanate anion can accept a proton $H^+$ to form isocyanic acid, H—N═C═O, which may undergo oligomerization to from cyanuric acid, the tautomeric structures of which are shown below:

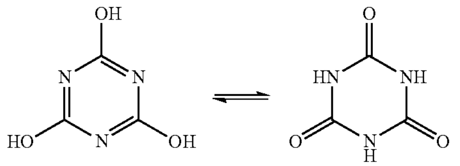 [SMILES: Oc1nc(O)nc(O)n1 ; O=c1[nH]c(=O)[nH]c(=O)[nH]1]

Therefore, preferred cyanate compounds are selected from cyanuric acid, isocyanic acid, compounds comprising a cyanate ester and compounds or salts comprising a cyanate anion. More preferably, the cyanate compound is a cyanate metal salt and, more preferably still is selected from sodium cyanate (NaOCN), potassium cyanate (KOCN) and silver cyanate (AgOCN). Most preferably the cyanate compound is sodium cyanate.

In preferred embodiments, said anti-corrosion agent is selected from the group consisting of polyphosphate salts, organophosphates of formula $R—O—PO_3H_2$ wherein $R═C_6$-$C_{10}$ alkyl; poly(3-ammoniumpropylethoxysiloxane) dodecanoate; $(NH_4)_2TiF_6$; sodium poly(methacrylate); triazole; BTA or a derivative thereof; cyanate compounds and any combination thereof.

In alternative preferred embodiments, said anti-corrosion agent is selected from the group consisting of polyphosphate salts, organophosphates of formula $R—O—PO_3H_2$ wherein $R═C_6$-$C_{10}$ alkyl; poly(3-ammoniumpropylethoxysiloxane) dodecanoate; $(NH_4)_2TiF_6$; sodium poly(methacrylate); triazole and BTA or a derivative thereof.

In a particularly preferred embodiment, however, the corrosion inhibitor is BTA or a derivative thereof, and is preferably BTA. Several derivatives of benzotriazole are known to have anti-corrosive effects. One suitable group of derivatives are benzotriazoles substituted at one or more of the 4-, 5-, 6- or 7-positions of the BTA core structure with a $C_1$-6 alkyl group, more suitably with a $C_{1-4}$ alkyl group and preferably with methyl. Examples of this type of corrosion inhibitor include 4-methyl-1H-benzotriazole, 5-methyl-1H-benzotriazole, 6-methyl-1H-benzotriazole and 5,6-dimethyl-1H-benzotriazole.

Alternatively, the benzotriazole core structure may be substituted at the 1-position, typically with a —C(O) aryl or —C(O) heteroaryl group, for example phenylcarbonyl, pyridylcarbonyl, pyrrolecarbonyl or thienylcarbonyl. Examples of anti-corrosion agents of this type include 1-(2-pyrrolecarbonyl)benzotriazole (PBTA) and 1-(2-thienylcarbonyl)benzotriazole (TBTA).

Other BTA derivatives include 1-hydroxymethyl benzotriazole and N,N-dibenzotriazol-1-ylmethylamine.

In a further preferred embodiment, said corrosion inhibitor is 1, 2, 3- or 1,2,4-triazole or a derivate thereof such as 3,5-bis(4-methyltiophenyl)-4H-1,2,4-triazole (4-MTHT), 3,5-bis(4-pyridyl)-4H-1,2,4-triazole (4-PHT), 3,5-diphenyl-4H-1,2,4-triazole (DHT), (1-(pyridin-4-ylmethyl)-1H-1,2,3-triazole-4-yl) methanol (PTM) or (1-Benzyl-1H-1,2,3-triazole-4-yl) methanol (BTM).

In a further preferred embodiment, said corrosion inhibitor is a phosphate salt, more preferably a polyphosphate salt, and is most preferably SHMP.

In a further preferred embodiment, said corrosion inhibitor is a cyanate compound, more preferably a cyanate compound selected from cyanuric acid, isocyanic acid, compounds comprising a cyanate ester and compounds or salts comprising a cyanate anion, more preferably still a cyanate metal salt and most preferably sodium cyanate.

Halloysites and other nanotubular structures can be loaded with corrosion inhibitors such as those mentioned above using nanotube packing methods known in the art and described for example by Abdullayev et al. (18). Typically, nanotubes, such as halloysites are added to a solution of the corrosion inhibitor and the mixture is placed under vacuum for between 1-5 h to remove the air from the lumen of the nanotubes and allow it to be replaced by the corrosion inhibitor. The suspension is then cycled back to atmospheric pressure. This process can be repeated to obtain maximal loading efficiency.

The nanotubes are sealed to prevent the corrosion inhibitor from leaching from the nanotube during the electroplating or electroless plating process in which the metallic surface coating layer is formed. It is important that the material with which the nanotube is sealed is chosen such that, when exposed to a corrosive environment, it will react with corrosive agents in the environment such that the seal is removed from the nanotube, allowing the corrosion inhibitor to leach out of the nanotubes. Corrosive environments include the atmosphere, particularly when water is present and/or where pollutants such as industrial residues, exhaust fumes from vehicles or sea water are present, and also marine environments. Corrosive agents include oxygen, water, acids such as hydrochloric acid, carbonic acid and sulphuric acid formed by the dissolution of environmental pollutants in water and aqueous ions such as chloride ions.

The material with which the nanotube is sealed is not particularly limited, provided that said material can, when in a solution containing corrosion inhibitor-loaded nanotubes, react with the anti-corrosion agent present in the lumen of the nanotube to form an insoluble complex which acts as a stopper, thereby sealing the ends of the nanotube.

References in the present specification to nanotubes sealed with a metal refer to loaded nanotubes in which the ends are stoppered following reaction of ions of the metal with the anti-corrosion agent to form an insoluble complex.

In a preferred embodiment of the invention said nanotubes are sealed with a material comprising metal ions, wherein said metal ions are preferably ions of transition metals as defined above or alkaline earth metals.

Preferably, the nanotubes are sealed with a material comprising metal ions other than copper.

Alkaline earth metals include the following elements: beryllium (Be), magnesium (Mg), calcium (Ca), strontium (Sr), barium (Ba), and radium (Ra). However, for the purpose of the present invention, alkaline earth metals are preferably selected from beryllium, magnesium and/or calcium, and more preferably from magnesium and/or calcium.

Most preferably, the alkaline earth metal is calcium.

In further preferred embodiments of the invention, said nanotubes are sealed with a material comprising transition metal ions. In such embodiments, the transition metal ions used to seal the nanotubes are preferably ions of a metal selected from the group consisting of zinc, silver, gold, nickel and any combination thereof; and more preferably said metal is zinc.

Alternatively, said nanotubes are sealed with a material comprising alkaline earth metal ions. In such embodiments, the metal ions used to seal the nanotubes are preferably ions of a metal selected from the group consisting of calcium, magnesium and any combination thereof. More preferably said alkaline earth metal is calcium.

In a particularly preferred embodiment of the invention, said nanotubes are halloysites comprising the anti-corrosion inhibitor benzotriazole or a derivative thereof, but more suitably benzotriazole, and said nanotubes are sealed with zinc ions.

In a further particularly preferred embodiment of the invention, said nanotubes are halloysites comprising benzotriazole or a derivative thereof, but more suitably benzotriazole, and said nanotubes are sealed with calcium ions.

In a further particularly preferred embodiment of the invention said nanotubes are halloysites comprising a phosphate salt anti-corrosion inhibitor, preferably a polyphosphate salt and most preferably SHMP, and said nanotubes are sealed with zinc ions.

In a further particularly preferred embodiment of the invention said sealed nanotubes are halloysites comprising a phosphate salt, preferably a polyphosphate salt and most preferably SHMP, and said nanotubes are sealed with calcium ions.

In a further particularly preferred embodiment of the invention, said nanotubes are halloysites comprising a cyanate compound corrosion inhibitor, preferably a cyanate compound selected from cyanuric acid, isocyanic acid, compounds comprising a cyanate ester and compounds or salts comprising a cyanate anion, more preferably a cyanate metal salt and most preferably sodium cyanate, wherein said nanotubes are sealed with zinc ions.

In a further particularly preferred embodiment of the invention, said nanotubes are halloysites comprising a cyanate compound corrosion inhibitor, preferably a cyanate compound selected from cyanuric acid, isocyanic acid, compounds comprising a cyanate ester and compounds or salts comprising a cyanate anion, more preferably a cyanate metal salt and most preferably sodium cyanate, wherein said nanotubes are sealed with calcium ions.

In an embodiment of the invention, said sealed nanotubes comprise from about 1-25 wt % anti-corrosion agent, preferably from about 1-6 wt % anti-corrosion agent, or more preferably 1, 2, 3, 4, 5, 6 wt % anti-corrosion agents, wherein wt % refers to the total weight of the unloaded nanotubes. In particularly preferred embodiments, said sealed nanotubes comprise between 4-5 wt % anti-corrosion agent.

In a further embodiment of the invention said sealed nanotubes comprise from about 1 to 25 wt % benzotriazole or a derivative thereof, suitably from about 1 to 6 wt % and still more suitably from about 3 to 6 wt % and still more suitably from about 4-5 wt %, for example about 5% benzotriazole or derivative thereof. More preferably the sealed nanotubes comprise about 5 wt % benzotriazole, wherein wt % refers to the total weight of the unloaded nanotubes.

In a preferred embodiment of the invention said sealed nanotubes are halloysites comprising from about 1 to 6 wt % benzotriazole sealed with zinc, wherein wt % refers to the total weight of the unloaded halloysites.

In an alternative, equally preferred embodiment, said sealed nanotubes are halloysites comprising from about 1 to 6 wt % benzotriazole sealed with calcium, wherein wt % refers to the total weight of the unloaded halloysites.

In an alternative, equally preferred embodiment, said sealed nanotubes are halloysites comprising from about 1 to 6 wt % phosphate salt sealed with calcium, wherein wt % refers to the total weight of the unloaded halloysites.

In an alternative, equally preferred embodiment, said sealed nanotubes are halloysites comprising from about 1 to 6 wt % phosphate salt sealed with zinc, wherein wt % refers to the total weight of the unloaded halloysites.

In an alternative, equally preferred embodiment, said nanotubes are halloysites comprising from about 1 to 6 wt % cyanate compound sealed with zinc, wherein wt % refers to the total weight of the unloaded halloysites.

In an alternative, equally preferred embodiment, said sealed nanotubes are halloysites comprising from about 1 to 6 wt % cyanate compound sealed with calcium, wherein wt % refers to the total weight of the unloaded halloysites.

Suitably, the sealed and loaded halloysites are present in the coating layer an amount from about 0.01 to 15%, more suitably from about 0.02 to 12%, still more suitably from 0.2 to 10%, still more suitably from 0.5 to 8%, still more suitably from about 0.5 to 7%, 1 to 6% or 1 to 5% by weight with respect to the total weight of the coating layer.

In a preferred embodiment of the invention said sealed nanotubes provide a sustained release of the corrosion inhibitor.

As set out above, the substrate is a metallic substrate. A metallic substrate can be a metal or may be a non-metallic object such as polypropylene, Teflon or polycarbonate which has been metalized by adding a metal coating. Methods for electroporating or electroless plating non-metallic surfaces are known in the art and disclosed in U.S. Pat. Nos. 4,683,036 and 4,142,902, respectively, both of which are incorporated by reference.

In an embodiment of the invention said substrate is a metal, for example a metal selected from the group consisting of iron, steel, mild steel, aluminium and aluminium alloys, wherein said alloys further comprise one or more metal selected from copper, magnesium, manganese, silicon, tin, nickel, silver, gold and zinc.

Preferably, said substrate is selected from the group consisting of iron, steel, mild steel, aluminium and aluminium alloys comprising copper, magnesium, manganese, silicon, tin and zinc.

In a further preferred embodiment of the invention said substrate is steel or mild steel. In a further preferred embodiment of the inventions said substrate is in the form of a screw, nail, nut, bolt, coin.

In a preferred embodiment of the invention said coating layer is from about 1 to 100 μm thick, more preferably from about 1 to 40 μm thick, more preferably from about 10 to 40 μm thick, still more preferably from about 15 to 30 μm thick, and even more preferably about 20 or 25 μm thick.

In a preferred embodiment of the invention said coating layer has a tensile strength of from about 200 to 1000 MPa, more preferably from about 350 to 500 MPa and even more preferably from about 400-500 MPa. This is significantly greater than the tensile strength of organic coatings such as paints, which is typically in the region of about 0.5 to 1 MPa (18,21).

In a further preferred embodiment of the invention the surface of said metallic substrate is coated with a coating layer comprising copper having dispersed therein halloysite nanotubes loaded with benzotriazole or a derivative thereof, wherein said nanotubes are sealed with zinc or calcium, preferably zinc.

In an alternative embodiment of the invention the surface of said metallic substrate is coated with a coating layer consisting of copper having dispersed therein halloysite nanotubes loaded with benzotriazole, preferably at a concentration 1-6 wt %, and wherein the halloysite nanotubes are sealed with zinc or calcium, preferably zinc.

In an alternative embodiment of the invention, the surface of said metallic substrate is coated with a coating layer consisting of copper having dispersed therein halloysite nanotubes loaded with a phosphate salt, preferably at a concentration 1-6 wt %, and wherein the halloysite nanotubes are sealed with zinc or calcium, preferably zinc.

In an alternative embodiment of the invention the surface of said metallic substrate is coated with a coating layer consisting of nickel having dispersed therein halloysite nanotubes loaded with a phosphate salt, preferably at a concentration 1-6 wt %, and wherein the halloysite nanotubes are sealed with zinc or calcium, most preferably calcium.

In an alternative embodiment of the invention the surface of said metallic substrate is coated with a coating layer consisting of zinc having dispersed therein halloysite nanotubes loaded with benzotriazole, preferably at a concentration 1-6 wt %, and wherein the halloysite nanotubes are sealed with zinc or calcium, most preferably zinc. In an alternative embodiment of the invention the surface of said metallic substrate is coated with a coating layer consisting of silver having dispersed therein halloysite nanotubes loaded with a cyanate compound, preferably at a concentration 1-6 wt %, and wherein the halloysite nanotubes are sealed with zinc or calcium, most preferably calcium.

Preferably said phosphate salt is a polyphosphate salt, more preferably a hexametaphosphate salt, and is most preferably SHMP.

Preferably said cyanate compound is a cyanate metal salt, more preferably selected from sodium cyanate, potassium cyanate and silver cyanate, and most preferably is sodium cyanate.

According to a further aspect of the invention there is provided an electroplating solution wherein said electroplating solution comprises transition metal and/or post transition metal ions and a plurality of sealed nanotubes loaded with an anti-corrosion agent as described above. In an embodiment of the invention said transition metal and/or post transition metal ions are selected from the group consisting of copper ions, zinc ions, silver ions, tin ions, gold ions, nickel ions and any combination thereof. Preferably, said transition metal and/or post transition metal ions are selected from the group consisting of $Cu^{2+}$, $Zn^{2+}$, $Ag^{+}$, $Sn^{4}$, $Sn^{2+}$, Au, $Ni^{2+}$ and mixtures thereof.

In a preferred embodiment of the invention said electroplating solution comprises $Cu^{2+}$, $Zn^{2+}$ or $Ag^{+}$, $Ni^{2+}$ or a mixture of two or more thereof. Still more preferably said electroplating solution comprises $Cu^{2+}$ or $Zn^{2+}$ or a mixture thereof. Most preferably said electroplating solution comprises $Cu^{2+}$.

Suitably, the concentration of said transition metal and/or post transition metal ions, which are to be deposited at the cathode, is from 0.1M to 5M, more suitably from 0.7M to 2M and typically about 1M.

Said electroplating solution comprises anions, suitably anions such as $Cl^-$, $CN^-$, $PO_4^{3-}$, $CO_3^{2-}$ and $SO_4^{2-}$.

In a preferred embodiment of the invention said electroplating solution comprises $CuSO_4$ and $H_2SO_4$, for example $CuSO_4$ at 1 mol/dm$^3$ and 60 g/l $H_2SO_4$. This electroplating solution is particularly suitable when the coating layer for the metal substrate comprises or consists of copper.

In another preferred embodiment of the invention, said electroplating solution comprises $NiSO_4$, $NiCl_2$ and $H_3BO_3$, for example $NiSO_4$ at 300 g/L, $NiCl_2$ at 150 g/L and $H_3BO_3$ at 50 g/L. This electroplating solution is particularly suitable when the coating layer for the metal substrate comprises or consists of nickel.

The pH of the solution will depend upon the metal to be deposited at the cathode and can be adjusted by the addition of a suitable acid, for example sulphuric acid or hydrochloric acid or a suitable base, for example sodium hydroxide, to the electroplating solution.

In an embodiment of the invention said electroplating solution is acidic.

In a preferred embodiment of the invention said electroplating solution has a pH of from about 0.5 to 6.5, more preferably about 3.5 to 5.5, still more preferably about 4 to 5 and typically about 4.5.

In a further preferred embodiment of the invention said electroplating solution has a pH of 0.5, 1, 1.5, 2, 2.5, 3, 3.5, 4, 4.5, 5, 5.5 or 6.

Acidic electroplating solutions are suitable for coating substrate with metals such as copper, zinc and alloys thereof, for example brass. The chosen pH of the electroplating solution depends entirely on the solubility of the metal to be plated.

In an alternative embodiment of the invention, the electroplating solution is basic. In this case, the pH may be from about 7.5 to 10.5, preferably from about 8 to 10.

Basic solutions are suitable for coating a substrate with metals such as zinc, tin and alloys thereof. Basic solutions often require cyanide salt additions. The use of cyanide salts in electroplating is heavily regulated due to their high toxicity.

The zeta potential of the loaded nanotubes is pH dependent. Therefore, the pH of the plating solution may also be adjusted to ensure that the zeta potential of the loaded nanotubes is either positive, or neutral or, if negative is as close as possible to the isoelectric point. For example, unloaded halloysite nanotubes exhibit negative zeta potentials in aqueous solution, with the zeta potential becoming more negative as pH increases. It is therefore preferred that when the nanotubes are halloysites, the electroplating solution is acidic.

Loading of the halloysites with a corrosion inhibitor such as BTA causes a positive shift in the surface zeta potential, which does not appear to be affected by the formation of end caps. It has been found that when the pH of the solution is in the range of about 3.5 to 5.5, the surface zeta potential is close enough to the isoelectric point for the halloysites to be carried to the cathode by the physical diffusion in the solution adjacent the cathode.

More suitably, particularly when the coating material is copper, the pH of the solution is in the range of about 4 to 5, typically about 4.5.

Features of the nanotubes and the corrosion inhibitor are as described above tor the first aspect of the invention.

Suitably, the loaded nanotubes are present in the electroplating solution in a concentration of from about 0.1 to 150 g/L, more suitably from about 1 to 100 g/L, suitably from 1-50 g/l, more suitably from about 1 to 10 g/L, still more suitably from about 2 to 8 g/L, typically from about 4 to 6 g/L, for example about 5 g/L. It is preferred that immediately before the electroplating process begins, the loaded nanotubes are evenly dispersed in the electroplating solution.

According to a further aspect of the invention, there is provided an electroplating apparatus comprising a power source, an electroplating solution according to the invention, an anode and a cathode, wherein the anode and the cathode are connected to the power source and are immersed in the electroplating solution and wherein a substrate to be plated may be placed at or in contact with the cathode.

The power source, anode, electroplating solution and cathode therefore form an electrical circuit. The power suitably supplies direct current to the circuit. The apparatus may be used in a process for the preparation of a coated metallic substrate.

In an alternative aspect of the invention there is provided an electroless plating solution wherein said electroless plating solution comprises a reducing agent, transition metal and/or post transition metal ions and a plurality of sealed nanotubes loaded with an anti-corrosion agent as described above.

In a further embodiment the reducing agent is selected from hypophosphite, alkali metal borohydrides, soluble borane compounds, hydrazine, aldehyde reducing agents or a mixture thereof.

Preferably, the reducing agents are provided in the electroless plating solution at a concentration of from about 0.01 g/L to 200 g/L, more preferably from about 20 g/L and 50 g/L.

In a preferred embodiment said transition metal and/or post transition metal ions are selected from the group consisting of copper ions, zinc ions, silver ions, tin ions, gold ions, nickel ions and any combination thereof.

Preferably said metal ions are selected from the group consisting of $Cu^{2+}$, $Zn^{2+}$, $Ag^+$, $Sn^4$, $Sn^{2+}$, $Au^+$, $Au^{2+}$, $Ni^{2+}$ and mixtures thereof.

In a preferred embodiment of the invention said electroless plating solution comprises $Cu^{2+}$, $Zn^{2+}$, $Ag^+$, $Ni^{2+}$ or a mixture of two or more thereof. Still more preferably said metal ions are selected from $Cu^{2+}$, $Zn^{2+}$ or a combination thereof. Most preferably said metal ions are $Cu^{2+}$.

Suitably, the transition metal and/or post transition metal ions to be deposited on the substrate are provided as a salt in the electroless plating solution, wherein the concentration of said salt is from about 2-10 g/l and preferably from about 4-9 g/l.

Electroless plating solutions are known in the art and comprise a variety of compounds which allow the plating process such as metal ions, one or more reducing agents, one or more complexing agents and optionally stabilisers and brighteners. The metal ions are typically in aqueous solution in from of a soluble salt such as nickel chloride, nickel acetate, or nickel sulfonate. Reducing agents are known in the art and are preferably selected from the group consisting of hypophosphite, alkali metal borohydrides, soluble borane compounds and hydrazine. Typically, the concentration of the one or more reducing agents is from about 0.01 g/L and 200 g/L, more preferably from about 20 g/L and 50 g/L. The one or more complexing agents effectively prevents precipitation of the metal ions and are used at a concentration up to about 200 g/L and preferably from about 15 to 75 g/L, and most preferably from about 20 to 40 g/L. Suitable complexing agents include carboxylic acids, polyamines or sulfonic acids, or mixtures thereof. Stabilizing agents include organic and/or inorganic stabilizing agents such as lead ions, cadmium ions, tin ions, bismuth ions, antimony ions and zinc ions. The electroless plating deposition rate is further controlled by selecting temperature, pH and metal ion/reducer concentrations. Electroless plating can be performed over a broad pH range such as from about pH 4 to pH 10. The electroless plating solution can comprise further catalysts.

Features of the nanotubes and the corrosion inhibitor are as described above for the first aspect of the invention.

Suitably, the loaded nanotubes are present in the electroless plating solution in a concentration of from about 0.1 to 150 g/L, more suitably from about 1 to 100 g/L, suitably from 1-50 g/l, more suitably from about 1 to 10 g/L, still more suitably from about 2 to 8 g/L, typically from about 4 to 6 g/L, for example about 5 g/L. It is preferred that immediately before the electroless plating process begins, the loaded nanotubes are evenly dispersed in the electroless plating solution.

The sealed nanotubes containing anti-corrosion agent can be incorporated into an otherwise conventional electroless plating solution. For example, electroless nickel plating kits can be obtained commercially from Caswell Europe (https://www.caswelleurope.co.uk/electroless-nickel-plating-kit/).

In a preferred embodiment for nickel plating, an electroless plating solution comprises: sodium hypophosphate (10-20 g/L, preferably 14 g/L); acetic acid (15-25 g/L, preferably 22 g/L); DL-Malic acid (15-25 g/L, preferably 18 g/L); glycine (3-10 g/L, preferably 7 g/L); and boric acid (1-5 g/L, preferably 2 g/L).

According to a further aspect of the invention, there is provided an electroless plating apparatus comprising an electroless plating solution according to the invention disposed within a temperature controlled bath and a cathode material, wherein said cathode material is immersed in the electroless plating solution and wherein a substrate to be plated may be placed at or in contact with the cathode.

According to another aspect of the invention there is provided an electroplating process for the preparation of a coated metallic substrate according the first aspect of the invention comprising the steps of:

i) providing the electroplating solution according to the invention, a vessel to contain said electroplating solution, an anode immersed in the electroplating solution, a metallic substrate immersed in the plating solution and which is in electric contact with a cathode and a power source in electric contact with the anode and the cathode;
ii) applying an electric current from the power source for a time such that the surface of the substrate is coated with a metallic layer, and
iii) removing the coated metallic substrate according to the invention from the electroplating solution.

The process of electroplating is known in the art. Typically, the anode and the electroplating solution comprise the same metal which will form the coating of the substrate e.g. if the substrate is to be coated with a surface coating layer comprising copper, the anode comprises copper and the electroplating solution comprises copper ions, typically $Cu^{2+}$, for example it may comprise copper sulfate.

In a preferred process of the invention the anode comprises a metal selected from the group consisting of copper, zinc, silver, tin, gold, nickel, or an alloy comprising one or more thereof.

In a preferred process of the invention the anode comprises a metal selected from the group consisting of copper, zinc or tin, or an alloy comprising one or more of these.

More preferably, the metal is copper or zinc or an alloy of copper and/or zinc, for example brass.

In a preferred process of the invention said metallic substrate is as defined in the first aspect of the invention.

In a preferred process of the invention said metallic substrate is contained within a barrel and wherein said barrel is immersed in the electroplating solution and in contact with the cathode.

A barrel electroplating process is illustrated in FIG. 1 in which a plating material (a), which is a metal such as copper, is positioned at an anode (b) of a power source (f). At the cathode is a barrel (d) containing a number of plating substrates (e). Both the plating material (a) and the barrel (d) are immersed in an electroplating solution (g) which contains ions of the plating material as well as ions for adjusting the pH of the electroplating solution (g) to ensure solubility of the plating material ions. Thus, when the plating material is copper, the solution (g) may comprise copper (II) sulfate and sulphuric acid. In use, current is applied. Electrons are removed from the metal plating material at the anode such that metal ions are formed (for example $Cu^{2+}$ ions). These ions are solubilised in the electroplating solution and, because of their positive charge are attracted to the cathode, where they regain electrons and are deposited as a metal on the plating substrates (e). The barrel (d) rotates as indicated by arrow (h) to ensure even deposition of the plating material on the substrates (e).

Other electroplating methods may also be used, for example rack electroplating.

According to an alternative aspect of the invention there is provided an electroless plating process for the preparation of a coated metallic substrate according the first aspect of the invention comprising the steps of:

i) providing the electroless plating solution according to the invention in a vessel to contain said plating solution;
ii) immersing a metallic substrate in said plating solution for a time such that the surface of the metallic substrate is coated with a metallic layer, and
iii) removing the coated metallic substrate according to the invention from the electroless plating solution.

In a preferred process of the invention heat is applied to said plating solution recited in step i) or ii).

The term "heat" is used in this context as a temperature increase above room temperature, e.g. above about 18 to 25° C. Preferably, when heat is applied the temperature of the plating solution is raised to a temperature from about 30 to 100° C., more preferably from about 60 to 90° C. and most preferably from about 75 to 85° C.

In a preferred process of the invention said metallic substrate is as defined in the first aspect of the invention.

In a preferred process of the invention said metallic substrate is contained within a barrel and wherein said barrel is immersed in the plating solution and is optionally in contact with a heating element.

In preferred electroplating and/or electroless plating processes of the invention said process further comprises an initial process for preparing the electroplating solution or electroless plating solution. Therefore, the processes may comprise the preliminary steps of:

ia loading nanotubes with a corrosion inhibitor to form loaded nanotubes:
iia sealing said loaded nanotubes with a metal to form sealed nanotubes; and iiia dispersing said sealed nanotubes in an electroplating or electroless plating solution.

The process of the invention is advantageous as it has enabled the inventor to produce electroplated and/or electroless plated articles with a corrosion inhibitor incorporated into the metallic surface coating layer. Attempts to produce such a product using unencapsulated corrosion inhibitors or corrosion inhibitors loaded into unsealed nanotubes were not successful as the presence of the corrosion inhibitors in the electroplating and/or electroplating solution led to unsatisfactory deposition of the coating material. The coatings produced in these cases were blistered and discoloured and/or adherence to the substrate was unsatisfactory. Further, by providing the anticorrosion agent within a sealed nanotube, following successful plating in the coating, the nanotube seal or cap functions to provide a sustained release of the anti-corrosion agent.

Surprisingly, the inventor has demonstrated that although loaded nanotubes such as halloysites may have a negative surface charge, they are still deposited at the cathode with an electroplated coating layer. It appears that this may because the loaded nanotubes are sufficiently small in size to be moved by diffusion currents within the electrolyte flowing towards the anode. Similarly, the loaded nanotubes do not appear to inhibit the electroless plating process.

In a preferred process of the invention, dispersion of the nanotubes in said electroplating or electroless plating solution is achieved by mixing/agitating the plating solution prior to commencing the plating process This serves to break up aggregates of loaded nanotubes and to ensure that the loaded nanotubes are evenly dispersed in the electroplating or electroless plating solution.

In order to ensure even dispersion and to prevent aggregation of the nanotubes in the electroplating or electroless plating solution, mixing under high shear force is advantageous. High-shear mixers are known in the art and ensure that nanotube aggregates are broken down and that the nanotubes are evenly dispersed in the electroplating or electroless plating solution. High shear mixing is performed at a torque range from about 0.01-0.05 Nm.

In a preferred process of the invention said electroplating or electroless plating solution is mixed from about 1 to 20 min prior to commencing the plating process.

More preferably, said electroplating or electroless plating solution is mixed for at least 4 minutes, or, in ascending order of preference, at least 5, 6, 7, 8, 9 or 10 minutes, for example 4-20, 5-20, 6-20, 7-20, 8-20, 9-20 or 10-20 minutes, for example about 15 minutes.

The time for which any electric current or heat is applied will depend on a number of factors including the nature of the anode (if present), the metal to be deposited at the cathode, the pH and ionic strength of the electroplating or electroless plating solution, the electrical current density applied (if required) and the required thickness of the coating layer.

In a preferred electroplating process said electric current is applied for from about 5 to 240 minutes, more preferably from about 10 to 40 minutes, and particularly preferably from about 20 to 30 minutes, for example from about 24 to 25 minutes. In some cases, the electrical current may be applied for at least 5, 10, 15, 20, 25, 30, 45, 60, 120, 180 or 240 min.

In a preferred electroplating process said electric current has a current density from about 1-3 $A/m^2$, or preferably of about 1.71 $A/m^2$.

According to an aspect of the invention there is provided a metal plated substrate obtained by a plating method according to the invention.

In some embodiments, the metal plated substrate is obtained by an electroplating method. Alternatively, the metal plated substrate is obtained by an electroless plating method.

In the present specification, the term "$C_{6-10}$ alkyl" refers to a straight or branched saturated hydrocarbon group having six to 10 carbon atoms.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

All references, including any patent or patent application, cited in this specification are hereby incorporated by reference. No admission is made that any reference constitutes prior art. Further, no admission is made that any of the prior art constitutes common general knowledge.

Preferred features of each aspect of the invention may be as described in connection with any other aspect, unless incompatible therewith.

The invention will now be further described in the Figures and Examples below.

(a) nanotube in BTA containing solution; (b) vacuum removes air from inner lumen of nanotube; (c) application of pressure forces solution into the inner lumen of the nanotube; (d) nanotubes are washed and centrifuged; (e) nanotubes are dried; (f) dried loaded nanotubes are placed in solution containing transition metal ions; (g) BTA at the exposed ends of the nanotube lumen forms complex with transition mental ions from the solution; (h) the complex forms caps at the ends of the nanotubes; (i) the nanotubes are dried and ball milled.

Figure 3:
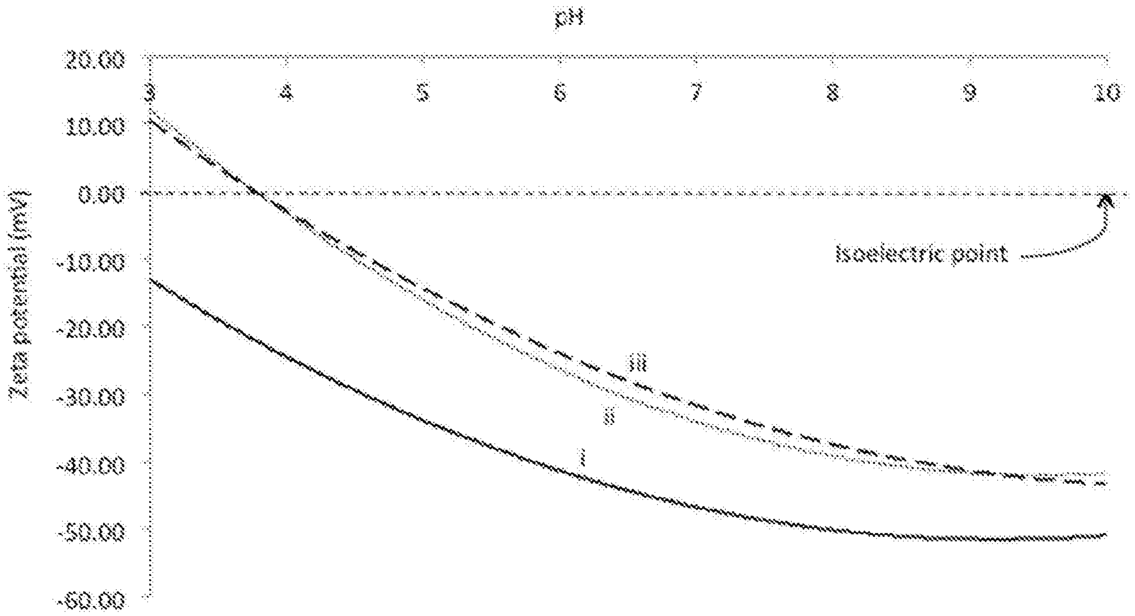

FIG. 3: plot showing zeta potential as a function of pH (3-10) in water for i) raw halloysites, ii) BTA loaded halloysites and iii) BTA loaded halloysites with caps.

Figure 4:
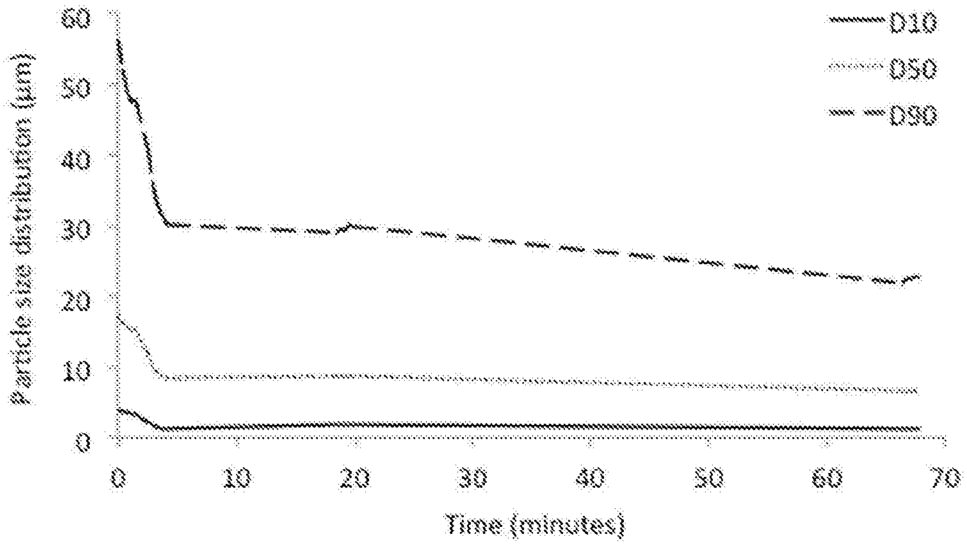
Figure 5A:
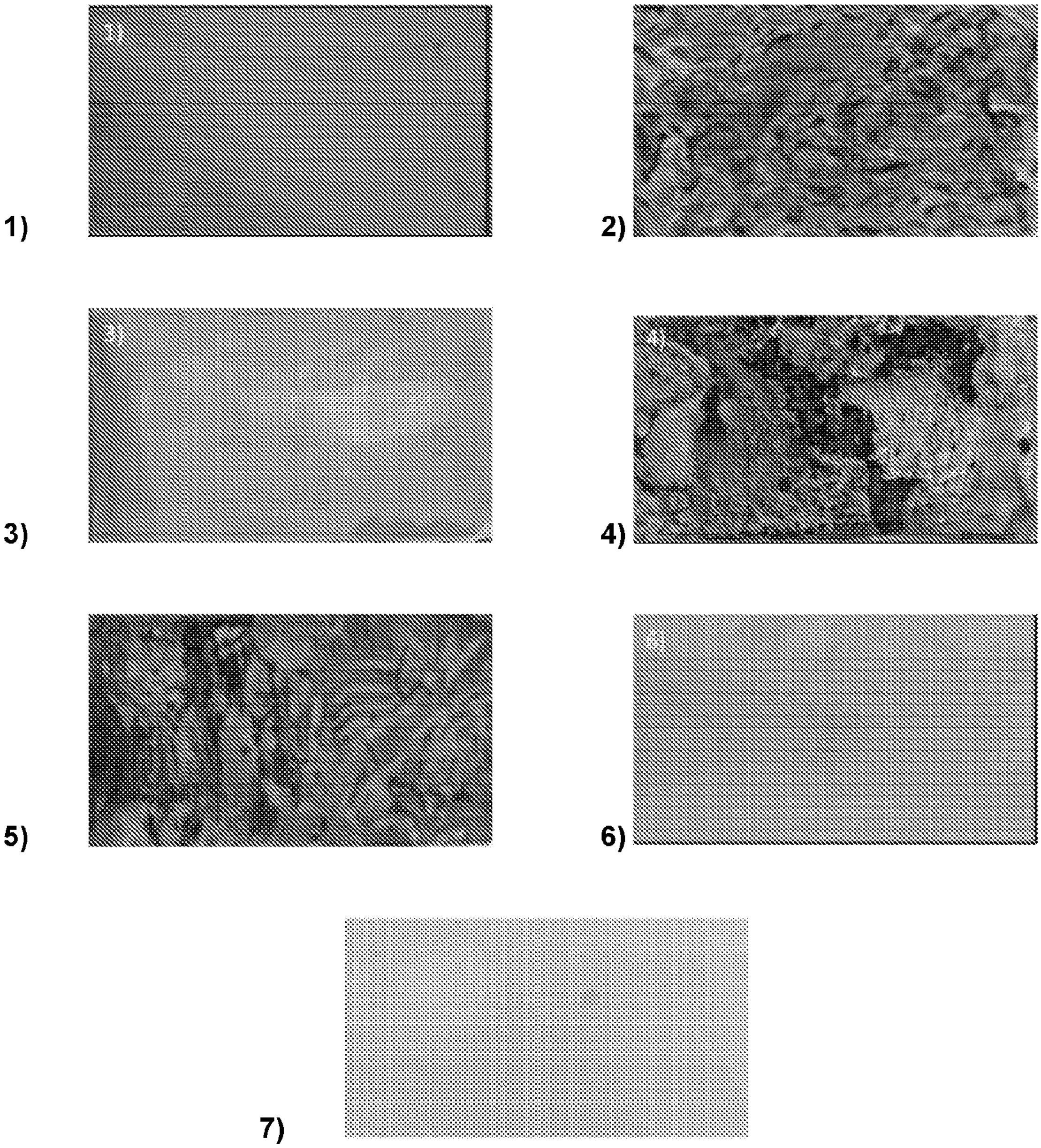
Figure 5B:
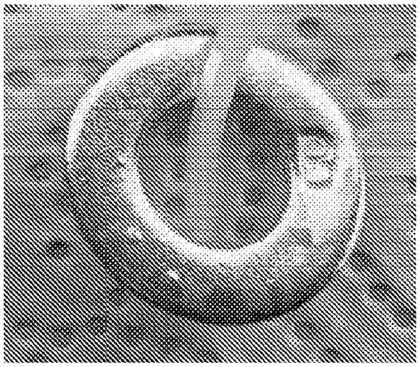
Figure 5B:
Figure 5B:
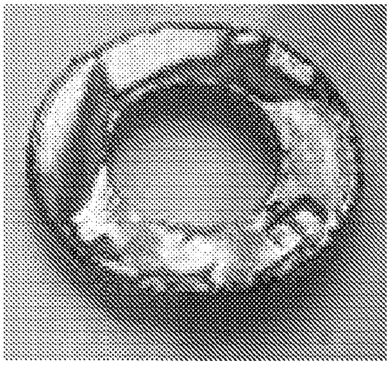
Figure 5B:
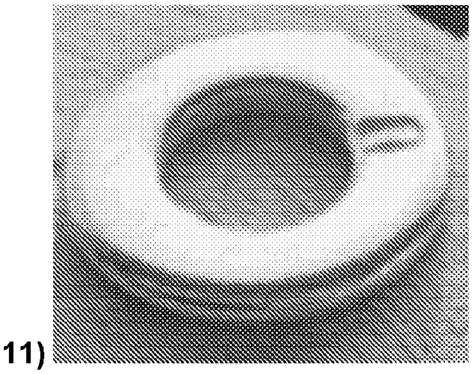
Figure 5B:
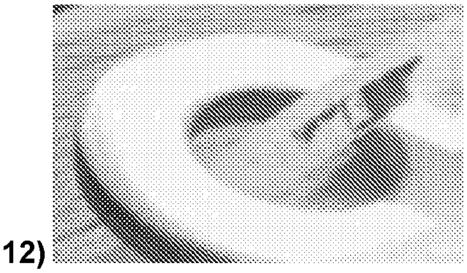
Figure 5C:
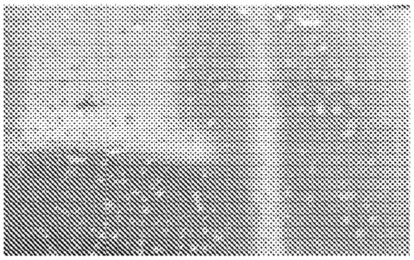
Figure 5C:
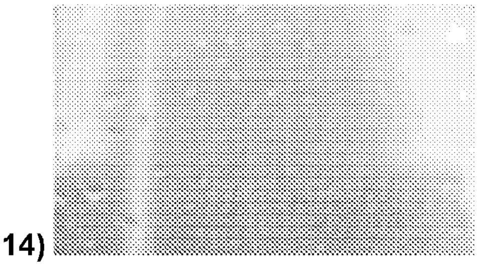
Figure 5C:
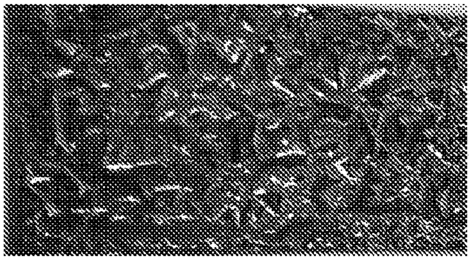
Figure 5C:
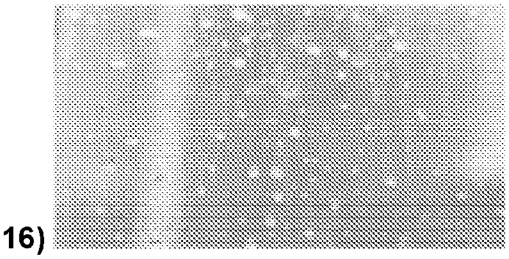
Figure 5C:
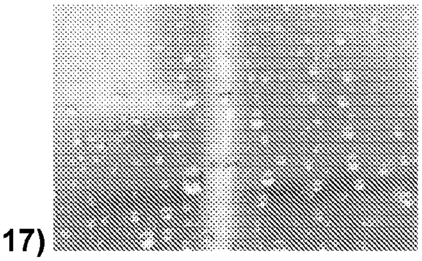

FIG. 4: plot showing average particle size distribution as a function of time for raw halloysites under high shear in electroplating solution FIG. 5: Images of electroplated mild steel specimens: (A) Images of the copper electroplated specimens with the following coating additive: 1) No additive control, 2) BTA (10 g/L), 3) raw halloysites (10 g/L), 4) BTA-loaded halloysites (10 g/L), 5) BTA-loaded halloysites (10 g/L) with Cu tube caps, 6) BTA-loaded halloysites (10 g/L) with Zn tube caps, and 7) BTA-loaded halloysites (50 g/L) with Zn tube caps; (B) Images of zinc electroplated specimens with the following coating additive: 8) No additive control, 9) Raw halloysite (10 g/L) control, 10) BTA-loaded halloysites (10 g/L), 11) BTA-loaded halloysites (10 g/L) with Zn tube cap, and 12); BTA-loaded halloysites (50 g/L) with Zn tube cap; (C) Images of nickel electroplated specimens with the following coating additive: 13) No additive control, 14) Raw halloysite (10 g/L) control, 15) SHMP loaded halloysite (10 g/L), 16) SHMP-loaded halloysites (10 g/L) with Ca tube caps, and 17) SHMP-loaded halloysites (50 g/L) with Ca tube caps.

Figure 6:
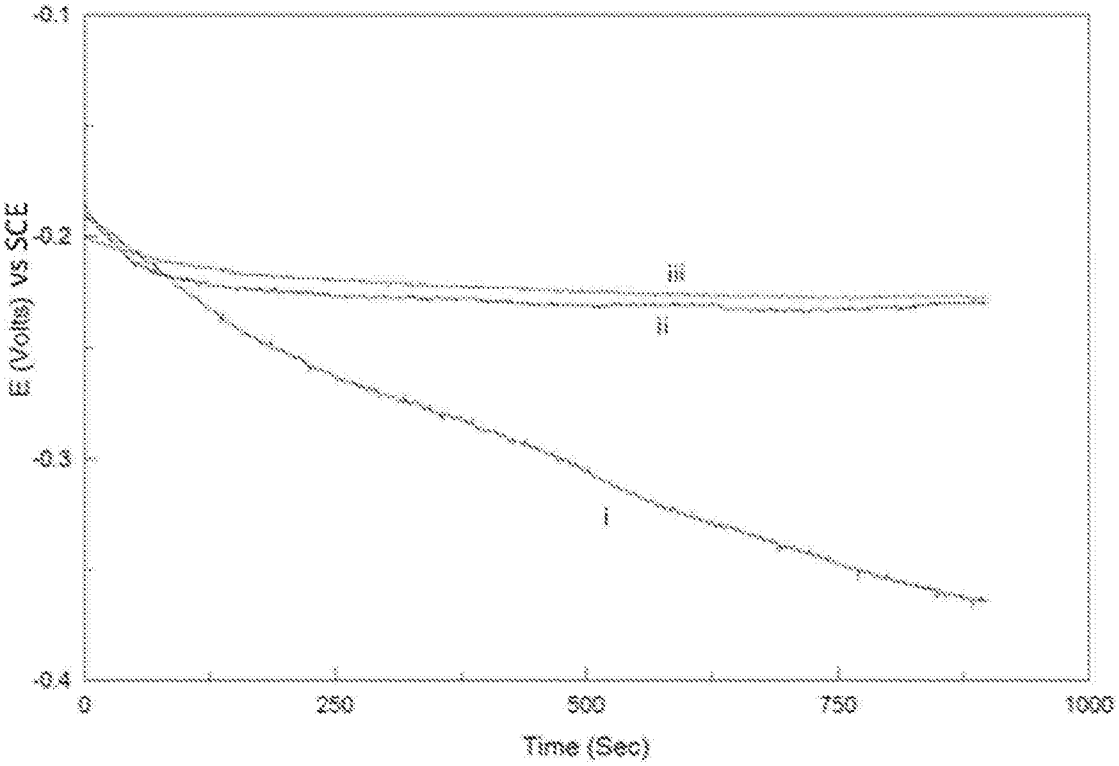

FIG. 6: OCP measurements recorded over 15 minutes for i) Zn capped BTA-loaded halloysite, ii) control and iii) Raw halloysite electroplate additions FIG. 7: Potentiodynamic polarisation of −0.5V from the OCP for i) Zn capped BTA-loaded halloysite, ii) control and iii) Raw halloysite electroplate additions FIG. 8:—Potentiodynamic polarisation of +0.8V from the OCP for i) Zn capped BTA-loaded halloysite, ii) control and iii) Raw halloysite electroplate additions FIG. 9: Images of copper electroplated mild steel specimens with the following coating additive: C1) No additive control, C2) BTA-loaded halloysites (0.02 wt %) with Zn tube caps; 18) BTA-loaded halloysites (1 wt %) with Ca tube caps; and 19) phosphate-loaded halloysites (1 wt %) with Zn tube caps.

Figure 10:
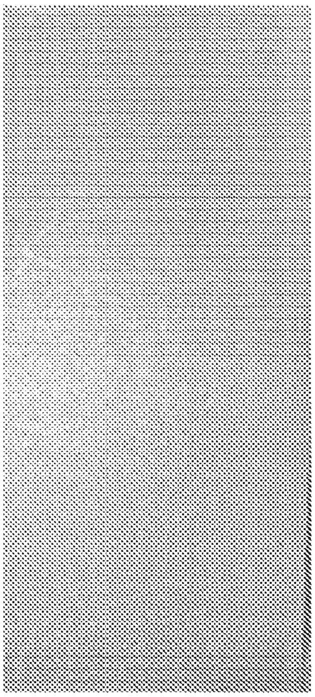
Figure 10:
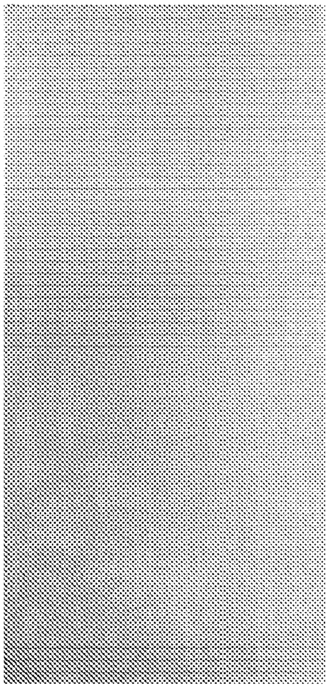
Figure 10:
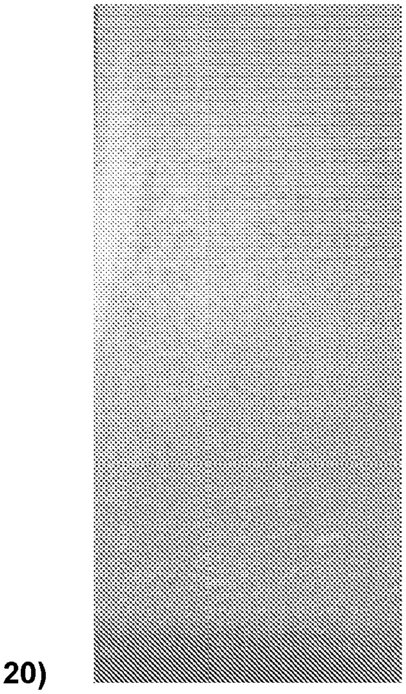

FIG. 10: Images of silver electroplated mild steel specimens with the following coating additive: S1) No additive control, S2) cyanate-loaded halloysites (0.2 wt %) with Ca tube caps; and 20) cyanate-loaded halloysites (0.2 wt %) with Zn tube caps.

Figure 11:
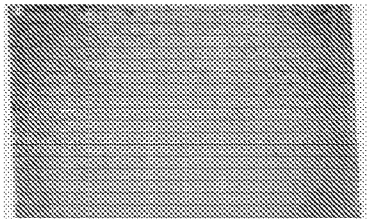
Figure 11:
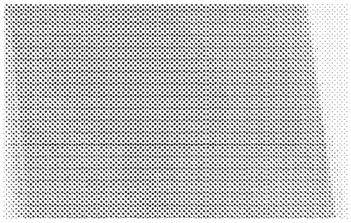

FIG. 11: Images of copper electroplated mild steel specimens with the following coating additive following completion of 12 month tarnish test: 1) No additive control, 6) BTA-loaded halloysites (10 g/L) with Zn tube caps.

Figure 12:
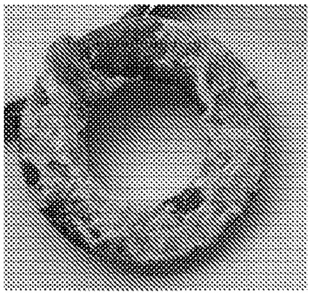
Figure 12:
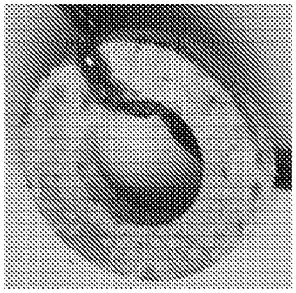

FIG. 12: Images of zinc electroplated mild steel specimens with the following coating additive following completion of 80 day natural weathering test: 8) No additive control, 11) BTA-loaded halloysites (10 g/L) with Zn tube caps.

Figure 13:
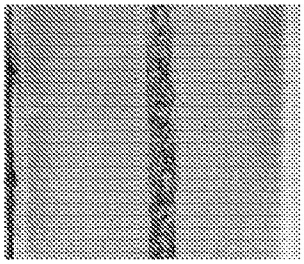
Figure 13:
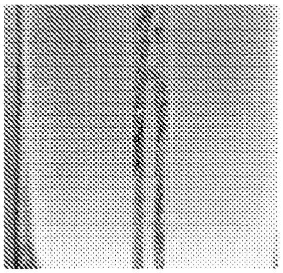
Figure 13:
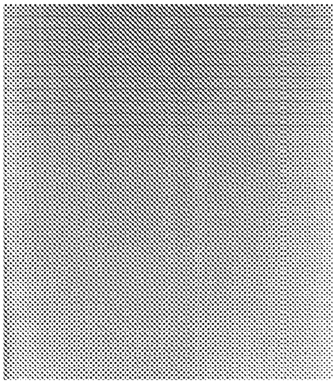

FIG. 13: Images of nickel electroplated mild steel specimens with the following coating additive following completion of 250 day natural weathering test: 13) No additive control, 14) unloaded (raw) halloysites (10 g/L), 16) phosphate-loaded halloysites (10 g/L) with Ca tube caps.

Figure 14:
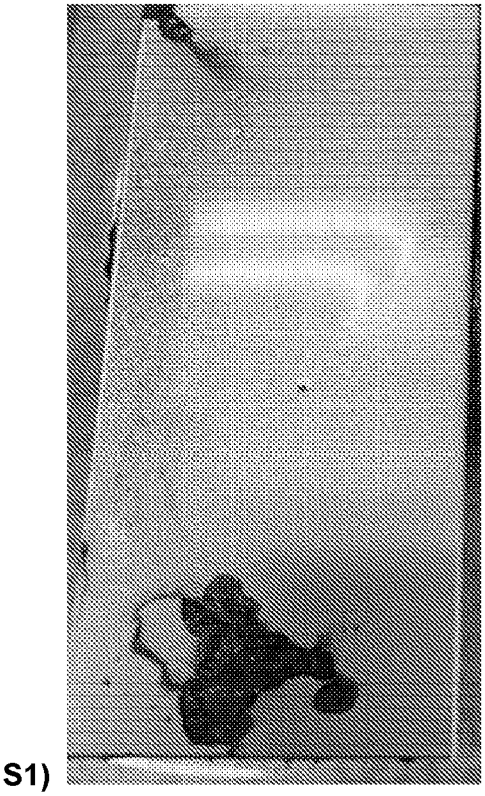
Figure 14:
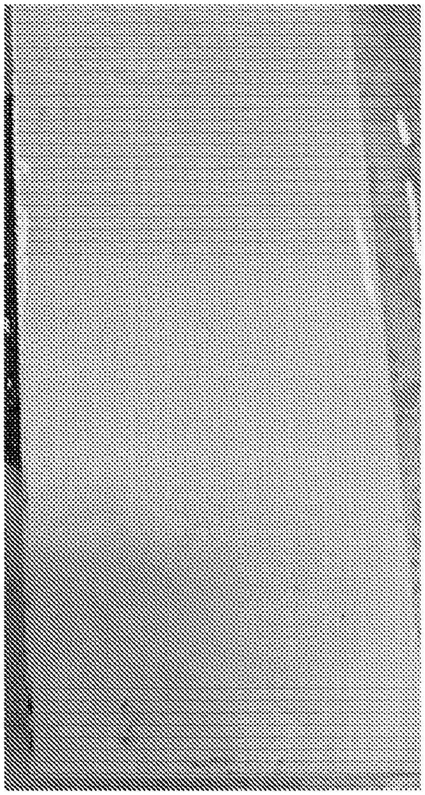

FIG. 14: Images of silver electroplated mild steel specimens with the following coating additive following completion of 168 hour humidity and splash tarnish test: S1) No additive control, S2) cyanate-loaded halloysites (0.2 wt %) with Ca tube caps.

DESCRIPTION OF THE ILLUSTRATED EMBODIMENTS

Materials and Methods

Example 1—Preparation of Electroplated Samples

Materials

The halloysite nanotube material, BTA, SHMP, salts ($CuSO_4 \cdot 5H_2O$, $ZnSO_4 \cdot 7H_2O$, $NiSO_4 \cdot 6H_2O$, NaCl) were purchased from Sigma Aldrich Ltd. The loaded nanotubes were manufactured at Swansea University. The copper, zinc and nickel electroplating solutions were made up at The Royal Mint electroplating foundry, comprising 1 mol/L $CuSO_4 \cdot ZnSO_4$ or $NiSO_4$ and 60 g/l $H_2SO_4$. Pure Cu, Zn or Ni bulk anode and mild steel cathodes (100×50×0.5 mm) were used as plating electrodes.

Methods

Surface charge measurements for loaded halloysite derivatives were recorded using a Malvern Zetasizer Nano™. The average effective diameter of raw halloysites following exposure to high shear mixing in the electroplating solution was taken using a Malvern Mastersizer 3000™, which provides particle size measurements on a volume average basis using a laser diffraction method.

Nanotube Packing

Figure 1:
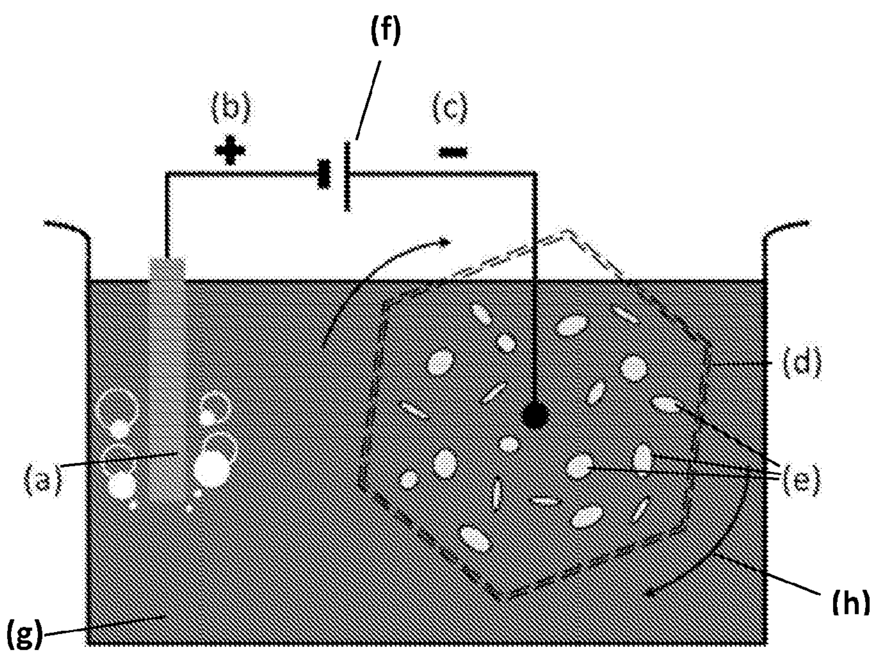
FIG. 1: Schematic representation of the barrel electroplating process.
Figure 2:
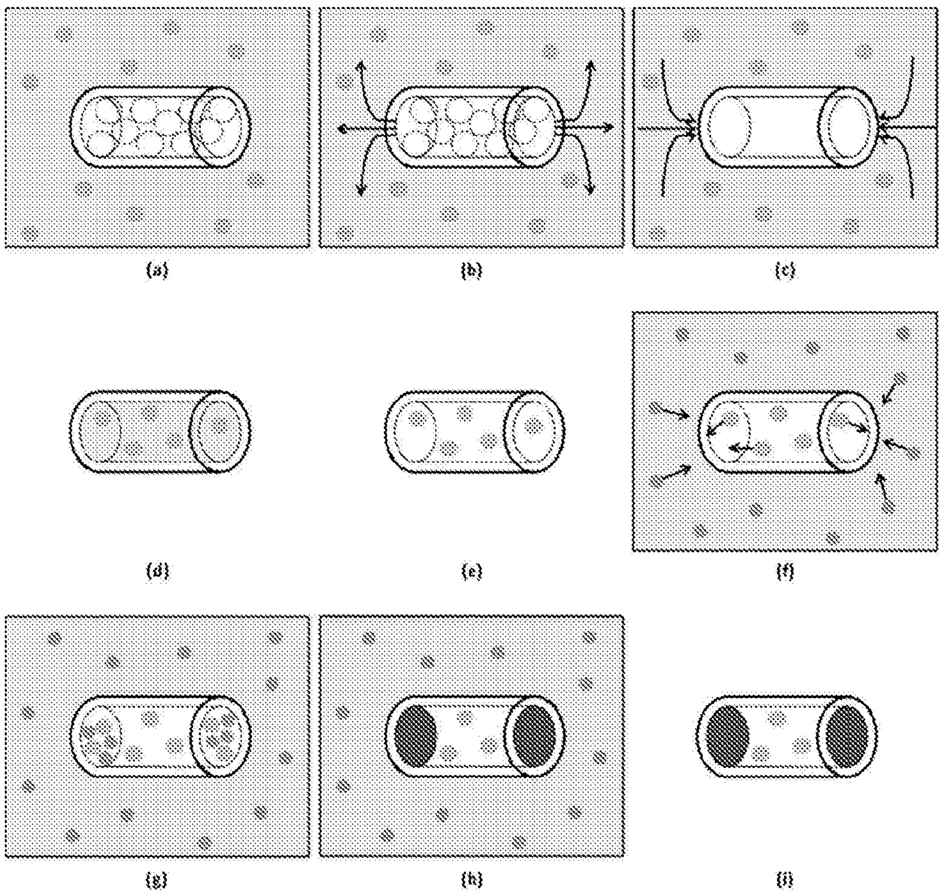
FIG. 2: shows an exemplary nanotube loading procedure and cap formation.

The halloysite loading method has been slightly adapted from that described by Abdullayev et al (18) and is depicted in FIG. 2: 2 litres of acetone was saturated with BTA at 20° C. (FIG. 2*a*). The solution was poured into in a vacuum chamber that was attached to a vacuum pump. 50 g/L of raw halloysite dry power was added to the chamber and constantly agitated using a magnetic stirrer. The chamber was then evacuated, and fizzing was observed immediately as air is forced from the nanotubes (FIG. 2*b*). The solution was left under vacuum for approximately 3 hours before being cycled back to atmospheric pressure. BTA containing solution is forced inside the nanotube cavity as pressure is reintroduced (FIG. 2*c*). This process was repeated 3 times to maximise halloysite loading. Loaded halloysite was separated from residual solution and centrifuged (FIG. 2*d*), and the remaining paste is washed with water and left to air dry (FIG. 2*e*). An analogous process was used to prepare SHMP loaded halloysites. The formation of 'caps' at the ends of the nanotubes occurs through the reaction of BTA inside the halloysite and transition metal ion in solution ($Cu^{2+}$ or $Zn^{2+}$) (FIGS. 2*f*, 2*g*, 2*h*). The metal-BTA complexes at the nanotube ends, effectively sealing BTA inside the halloysite (18). This ensures that BTA remains inside the carrier during electroplating and is released only when corrosive conditions cause metal-BTA bonds to break. Again, an analogous process was used to cap SHMP loaded halloysites. Specifically, the 'caps' were formed at the end of the nanotubes through the reaction of SHMP inside the halloysite and calcium ions in solution.

The anode and cathode materials were submerged in 250 mL of plating solution and electrically connected to the power supply. 10 g/L to 50 g/L of additive was included in the solution under high shear for 15 minutes before the power supply was turned on. A current density of 1.71 A/$m^2$ was applied for 24 minutes in each case achieving ca. 25 μm plate thickness in each case. Table 1 outlines the specimens produced.

TABLE 1

| Specimen | Substrate | Electroplate (25 μm) | Additive (1% wt./vol) | Nanotube cap |
|---|---|---|---|---|
| 1 | Mild steel | Cu | None | N/a |
| 2 | Mild steel | Cu | BTA | N/a |
| 3 | Mild steel | Cu | Raw halloysite | N/a |
| 4 | Mild steel | Cu | BTA loaded halloysite | None |
| 5 | Mild steel | Cu | BTA loaded halloysite | Cu |
| 6 | Mild steel | Cu | BTA loaded halloysite | Zn |
| 7 | Mild steel | Cu | BTA loaded halloysite* | Zn |
| 8 | Mild steel | Zn | None | N/a |
| 9 | Mild steel | Zn | Raw halloysite | N/a |
| 10 | Mild steel | Zn | BTA loaded halloysite | None |
| 11 | Mild steel | Zn | BTA loaded halloysite | Zn |
| 12 | Mild steel | Zn | BTA loaded halloysite* | Zn |
| 13 | Mild steel | Ni | None | N/a |
| 14 | Mild steel | Ni | Raw halloysite | N/a |

TABLE 1-continued

| Specimen | Substrate | Electroplate (25 μm) | Additive (1% wt./vol) | Nanotube cap |
|---|---|---|---|---|
| 15 | Mild steel | Ni | phosphate loaded halloysite | None |
| 16 | Mild steel | Ni | Phosphate loaded halloysite | Ca |
| 17 | Mild steel | Ni | Phosphate loaded halloysite* | Ca |

*5% wt./vol

Photography

Following electroplating, all samples were imaged using a Canon 600D digital SLR camera.

Results

Raw halloysites in water exhibit negative ζ potentials: −13.07, −46.7 and −50.87 mV, at pH 3,7 and 10 respectively—i) in FIG. 3. Loading the halloysites with BTA causes a positive ζ shift over the same pH range as shown in ii) of FIG. 3. The cap formation at the tube ends does not appear to influence the ζ potential as shown in FIG. 3, where ii) and iii) exhibit very similar trends. The electroplating solution used has a pH of 4.5; it is expected that raw halloysites, BTA-loaded halloysites and BTA-loaded halloysites with metal caps, will exhibit ζ potential values of ca. −30, −10 and −10 mV respectively during plating. The surface charge is therefore on the incorrect side of the isoelectric point (a positive charge is desirable for electrical attraction to a negatively charged cathode). However, ζ potentials at pH4.5 are close to the isoelectric point. This, combined with the physical diffusion associated with the solution adjacent to the cathode (with the power supply on) proved sufficient in plating out $Cu^{2+}$ and additive in situ.

The change in average halloysite particle size distribution is shown per unit time under high shear in FIG. 4. This indicates the extent of initial aggregation, and how this is reduced over time under high shear mixing. Individual halloysite nanotubes have diameter ranging from 10-150 nm and length ranging from 1-15 μm. FIG. 4 shows a sharp decrease in agglomeration in the first 5 minutes under mixing-90% of the sample has a size of 30.4 μm or less at 4.2 minutes. Halloysites additions are therefore exposed to high shear mixing no less than 15 minutes prior to electroplating, to assist in producing a fine, well-dispersed additive throughout the plated layer.

The images in FIG. 5 show the finished specimens following electroplating. Pure Cu plate with no additive produces a bright, uniform and well-adhered coating. Introducing 1 wt % (10 g/L) of BTA to the electroplating solution results in a dark and extremely blistered coating (a poor anti-corrosion electroplating additive in this case). Raw halloysite powder additions led to a uniform and bright Cu plate, much like that of the control specimen. The poor plate associated with uncapped and Cu-capped BTA-loaded halloysite additions is likely a consequence of BTA leaching out of the nanotubes in the electroplating solution and interfering with the Cu deposition causing blistering and discolouration. Using Zn as nanotube capping agent appears to have sealed the BTA inside the halloysite successfully during transit. The coating is bright, uniform and well-adhered. This specimen appears brighter than the control as a result of the additive, included at 10 g/L or 50 g/L. Raw and Zn-capped BTA-loaded halloysite electroplating additives have successfully been included in a Cu plate for further corrosion testing. It appears that BTA is extremely detrimental to the electroplating of Cu on mild steel under these experimental conditions, as it is seriously detrimental to Cu lamination and plate brightness. Raw halloysites do not interfere with the Cu plate quality. Sealed with Zn caps, halloysites can deliver BTA into a Cu plate without negatively influencing the quality of the coating as shown by images 6 and 7 in FIG. 5.

Images 8 to 12 in FIG. 5 also demonstrate that BTA is detrimental to the electroplating of zinc on mild steel, but BTA loaded halloysites sealed with Zn caps can deliver BTA into a zinc plate without negatively influencing the quality of the coating.

Images 13 to 17 in FIG. 5 demonstrate not only that phosphate is detrimental to the electroplating of nickel on mild steel, but also that a bright, uniform and well-adhered nickel coating can be achieved using corrosion inhibitor (SHMP) loaded halloysites sealed with calcium.

Example 2—Corrosion Testing

Corrosion Testing Method

The specimens were cut into ca. 1 $cm^2$ squares and polished by lightly abrading the plate surface with an alumina suspension. Samples were subsequently washed with DI water and dried. A 0.95 $cm^2$ area of the plate was exposed by screwing the sample into a nylon working electrode (WE) casing. The WE was immersed in a 1% w/v NaCl (aq) electrolyte (pH7) adjacent to a saturated calomel electrode (SCE) reference electrode (RE). Time dependent open-circuit potential (OCP) measurements were recorded using a Solartron SI 1280B Electrochemical Workstation. Potentiodynamic data was obtained by polarising the WE +0.8V and −0.5V about the free corrosion potential to measure the anodic and cathodic current densities respectively. A platinum counter electrode (CE) was included in the setup (distanced from the WE and RE) in order to do this. Potentiodynamic data was obtained immediately after OCP experiments in the same solution to allow the sample surface to equilibrate.

Results

Figure 7:
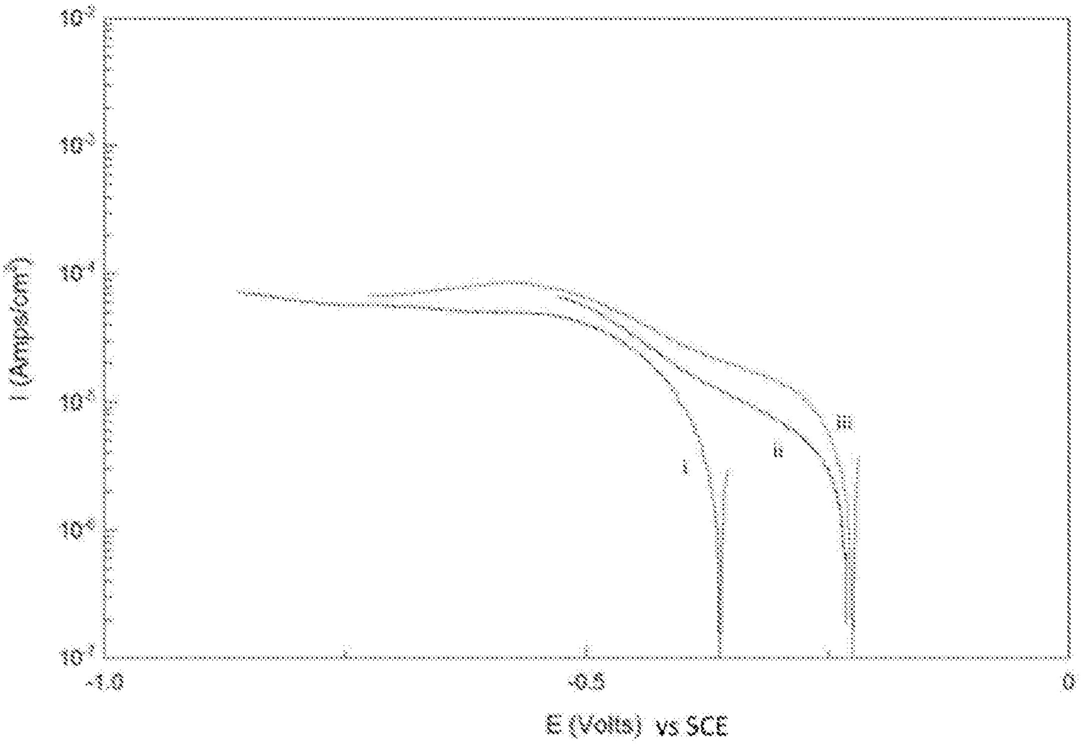
Figure 8:
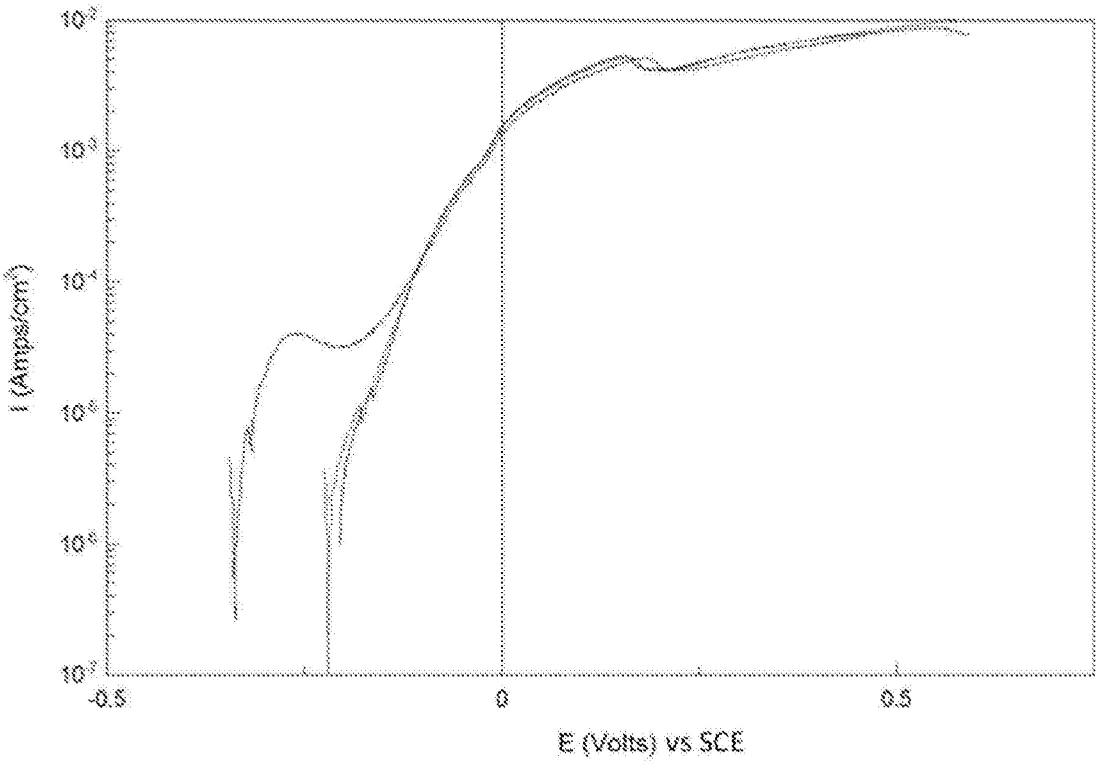
Figure 9:
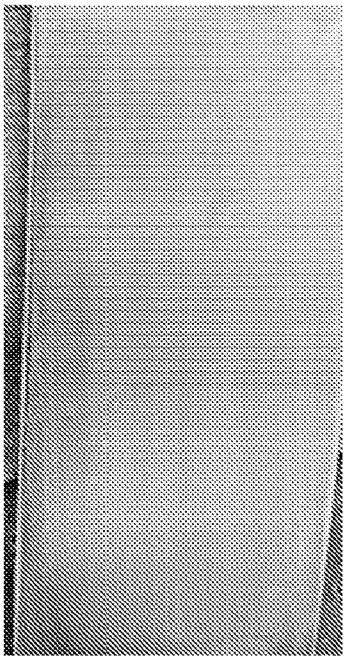
Figure 9:
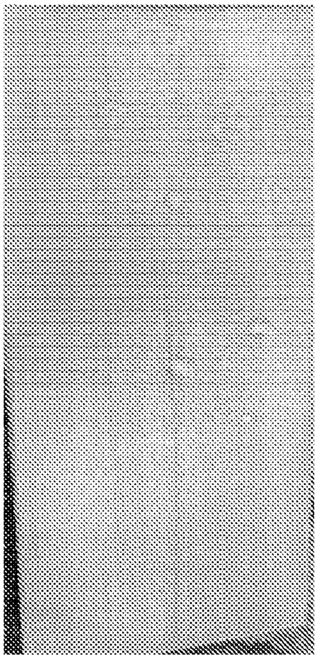
Figure 9:
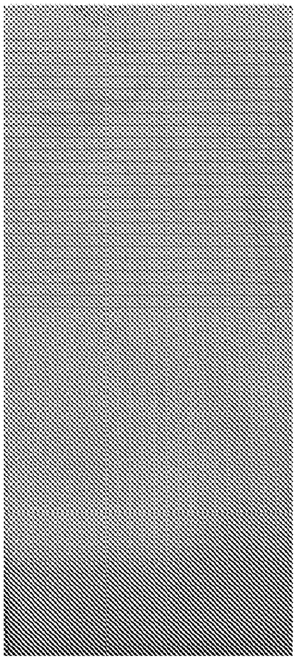
Figure 9:
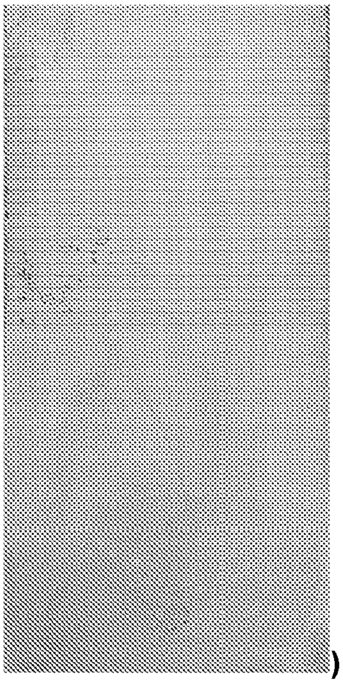

The variation in OCP over time in the presence of an inhibitor is often a good indication of whether anodic or cathodic processes are being affected. OCP measurements are recorded over 15 minutes in a corrosive electrolyte of 1% w/v NaCl (aq) (pH7) and displayed in FIG. 6. Cu plated specimens containing no additive and raw halloysites are shown to exhibit very similar OCP signals over time, where the initial OCP gradually decreases to equilibrium from ca. −200 to −220 mV vs SCE. Cu plate with raw halloysite additives exhibits neither anodic nor cathodic inhibition, referring to the control specimen in FIG. 6. The Zn-capped BTA-loaded halloysite Cu plate gradually decreases from ca. −200 to −370 mV vs SCE. The negative shift of 170 mV vs SCE indicates that the cathodic process is being retarded by the adsorption of BTA onto active cathode sites, delaying the oxygen reduction reaction. When the WE is polarised under the same experimental condition the variation in OCP is better defined as shown in FIG. 7. This further supports that BTA has successfully released from the halloysite nanotubes and is acting preferentially at the cathodic sites on the Cu plate surface. FIG. 8 demonstrates the anodic Tafel trend, for which a depression is observed for the Zn-capped BTA loaded halloysite Cu plate specimen. This indicates passivation of the metal surface by the action of BTA.

Halloysite nanotubes have been successfully electroplated throughout a 25 μm Cu plated layer. The surface charge character of loaded and unloaded halloysite has been measured over a pH ranging 3-10. A decrease in ζ potential is shown as solution basicity is raised, with an isoelectric condition identified at ca. pH4 for unloaded and loaded/capped halloysites. The effects of solution diffusion adjacent to the cathode-solution interface were sufficient enough to overcome the weak electrical repulsion (in a pH4.5 electroplating solution) between the pigment and mild steel cathode, such that additive was included in the Cu plated coating. The average particle size distribution of raw halloysite showed that 90% of the sample exhibited a size of 30.4 μm in less than 4.2 minutes in the electroplating solution under high shear mixing (this condition was therefore applied for 15 minutes before electroplating commenced) to limit aggregation and agglomeration during plating, ensuring a finer distribution of additive throughout the Cu plate. The loading procedure closely resembles that carried out by Abdullayev et al (18), and by successfully sealing BTA inside the halloysite during electroplating (using a Zn capping agent), active corrosion inhibitor (BTA) has been included throughout the Cu plate without disrupting the plate adherence or colour. It was found that BTA, either as a raw additive, or loaded into halloysite with subsequent leaching into the electroplating solution, caused severe Cu plate blistering and discolouration. Cu plate with Zn capped BTA-loaded halloysite additions show OCP potential measurements over 15 minutes that are significantly lower than that of a control. This indicates that the BTA is releasing from encapsulation in a corrosive environment and acting preferentially on cathodic sites at the Cu plate surface. A depression in the anodic branch of the Tafel relationship is also observed, indicating the formation of a passivation film, as the additive loaded sample is positively polarised. This study has shown that environmentally friendly and cost-effective, anti-corrosion pigments can be added to a Cu-plate electroplating setup to further, and successfully respond to a corrosive environment.

Example 3—Preparation of Electroless Plated Samples

To demonstrate that acceptable (bright, uniform and well-adhered) metallic coatings can also be achieved via electroless plating in the presence of sealed, corrosion inhibitor loaded halloysites, a commercially available electroless nickel plating kit (https://www.caswelleurope.co.uk/electroless-nickel-plating-kit/) was modified by the addition of calcium capped, SHMP loaded halloysites (5 g/L) to the electroless plating solution under high shear for 15 minutes before a mild steel substrate was submerged for plating. During plating, the pH of the plating solution was maintained between 6.8 and 6.9, and heating was applied to maintain a temperature of about 80° C. Similar to the results observed via electroplating, bright, uniform and well adhered coatings of ca. 25 μm plate thickness can be achieved.

Example 4—Preparation of Additional Copper Electroplated Samples

To further demonstrate the utility of various sealed, corrosion inhibitor loaded halloysites, additional Copper electroplated samples were prepared using sealed nanotube additives formed using different corrosion inhibitor and metal cap combinations and/or different nanotube additive levels.

Materials

The halloysite nanotube material, BTA, SHMP, salts ($CuSO_4 \cdot 5H_2O$, NaCl) were purchased from Sigma Aldrich Ltd. The loaded nanotubes were manufactured at Swansea University. The copper electroplating solutions were made up at Swansea University, comprising 1 mol/L $CuSO_4$ and 60 g/l $H_2SO_4$. Pure Cu bulk anode and mild steel cathodes (100×50×0.5 mm) were used as plating electrodes.

Methods

The halloysite loading method was adapted as necessary from that described in Example 1 above and depicted in FIG. 2 to prepare BTA or SHMP loaded halloysites. Nanotube end caps were then formed through a metal complexation reaction between BTA and $Zn^{2+}$ ions, BTA and $Ca^{2+}$ ions or SHMP and $Zn^{2+}$ ions.

The anode and cathode materials were submerged in 500 mL of copper plating solution and electrically connected to the power supply. 0 to 100 g/L (0 to 10 wt %) of additive was included in the solution under high shear for 15 minutes before the power supply was turned on. A current density of 1.71 A/$m^2$ was applied for 24 minutes in each case achieving ca. 20 μm plate thickness. Table 2 outlines the copper plated specimens produced.

TABLE 2

| Specimen | Substrate | Electroplate (20 μm) | Additive | Nanotube cap |
|---|---|---|---|---|
| C1 | Mild steel | Cu | None | N/a |
| C2 | Mild steel | Cu | BTA loaded halloysite (0.2 g/L) | Zn |
| C3 | Mild steel | Cu | BTA loaded halloysite (0.4 g/L) | Zn |
| C4 | Mild steel | Cu | BTA loaded halloysite (0.6 g/L) | Zn |
| C5 | Mild steel | Cu | BTA loaded halloysite (0.8 g/L) | Zn |
| C6 | Mild steel | Cu | BTA loaded halloysite (1 g/L) | Zn |
| C7 | Mild steel | Cu | BTA loaded halloysite (10 g/L) | Zn |
| C8 | Mild steel | Cu | BTA loaded halloysite (20 g/L) | Zn |
| C9 | Mild steel | Cu | BTA loaded halloysite (50 g/L) | Zn |
| C10 | Mild steel | Cu | BTA loaded halloysite (100 g/L) | Zn |
| 18 | Mild steel | Cu | BTA loaded halloysite (10 g/L) | Ca |
| 19 | Mild steel | Cu | Phosphate loaded halloysite (10 g/L) | Zn |

Results

In all cases, a bright, uniform and well-adhered coating was produced. Images for plated specimens C1, C2, 18 and 19 are provided in FIG. 9, demonstrating that BTA or phosphate loaded halloysites can be sealed with zinc or Calcium ion derived caps to deliver such corrosion inhibitors into a cupper plate without negatively influencing the quality of the coating.

Example 5—Preparation of Silver Electroplated Samples

Silver electroplated mild steel samples were also prepared using cyanate corrosion inhibitor-containing halloysites sealed via complexation with calcium or zinc ions.

Materials

The halloysite nanotube material and NaOCN were purchased from Sigma Aldrich Ltd. The loaded nanotubes were manufactured at Swansea University. A silver electroplating solution was purchased from Gateros Plating Ltd. and contains $C_2$, 4-Imidazolidinedione, 5,5-dimethyl, $Ag^+$, salt (2:1). Pure Ag bulk anode and mild steel cathodes (100×50×0.5 mm) were used as plating electrodes.

Methods

The halloysite loading method was adapted as necessary from that described in Example 1 above and depicted in FIG. 2 to prepare cyanate loaded halloysites. Nanotube end caps were then formed through a metal complexation reaction between cyanate and $Zn^{2+}$ or $Ca^{2+}$ ions.

The anode and cathode materials were submerged in 500 mL of silver plating solution at 50-55DegC and electrically connected to the power supply. 0 to 100 g/L (0 to 10 wt %) of additive was included in the solution under high shear for 15 minutes before the power supply was turned on. A current density of 0.5 $A/m^2$ was applied for 40 minutes in each case achieving 15-20 μm plate thickness. Table 3 outlines the silver plated specimens produced.

TABLE 3

| Specimen | Substrate | Electroplate (20 μm) | Additive | Nanotube cap |
|---|---|---|---|---|
| S1 | Mild steel | Ag | None | N/a |
| S2 | Mild steel | Ag | Cyanate loaded halloysite (2 g/L) | Ca |
| S3 | Mild steel | Ag | Cyanate loaded halloysite (4 g/L) | Ca |
| S4 | Mild steel | Ag | Cyanate loaded halloysite (6 g/L) | Ca |
| S5 | Mild steel | Ag | Cyanate loaded halloysite (8 g/L) | Ca |
| S6 | Mild steel | Ag | Cyanate loaded halloysite (10 g/L) | Ca |
| 20 | Mild steel | Ag | Cyanate loaded halloysite (2 g/L) | Zn |

Results

In all cases, a bright, uniform and well-adhered coating was produced. Images for plated specimens S1, S2 and 20 are provided in FIG. 10, demonstrating that cyanate corrosion inhibitors can be delivered into a silver plate without negatively influencing the quality of the coating.

Example 6—Further Corrosion Testing

Corrosion Testing Methods

Two copper electroplated mild steel specimens, corresponding to specimen 1 (additive free) and specimen 6 (BTA loaded halloysites (10 g/L) with Zn cap) were subjected to a 12 month tarnish test which involved exposing the specimens to indoor environmental conditions (50% humid air at 25° C.).

Two zinc electroplated mild steel specimens, corresponding to specimen 8 (additive free) and specimen 11 (BTA loaded halloysites (10 g/L) with Zn cap) were subjected to an 80 day natural weathering test which involved exposing the specimens to outdoor conditions (in Cheshire, UK) with a weekly spray of 3.5% NaCl solution to accelerate corrosion.

Three nickel electroplated mild steel specimens, corresponding to specimen 13 (additive free), specimen 14 (10 g/L unloaded halloysite) and specimen 16 (phosphate loaded halloysites (10 g/L) with Ca cap) were subjected to a 250 day natural weathering test which involved exposing the specimens to outdoor conditions (in Swansea UK) with a weekly spray of 3.5% NaCl solution to accelerate corrosion.

Two silver electroplated mild steel specimens, corresponding to specimen S1 (additive free) and specimen S2 (cyanate loaded halloysites (2 g/L) with Ca cap) were subjected to a 168 hour humidity and splash tarnish test which involved enclosing the specimens in a holding space with relative humidity of 80-90% and spraying 3.5% NaCl solution over the specimens daily.

Results

As shown in FIG. 11, significant tarnishing was observed on additive free specimen 1 upon completion of the 12 month tarnish test, whereas specimen 6 retained a bright, uniform and well-adhered coating. This indicates that the BTA was released from encapsulation in an aggressive, corrosive environment over time, thus protecting the copper plate from tarnish/corrosion. As the plating additive is present throughout the entire plating layer, corrosion protection can be maintained in abrasive and high wear service environments.

Similarly, as shown in FIG. 12, corrosion of the underlying steel, following breakdown of the zinc coating, was observed for additive free specimen 8 upon completion of the 80 day natural weathering test, whereas the integrity of the zinc coating was retained in specimen 11. This indicates that the BTA was released from encapsulation in an aggressive, corrosive environment over time, thus protecting the zinc plate from corrosion.

Further, as shown in FIG. 13, significant corrosion of the nickel plate was observed upon completion of the 250 day natural weathering test for both additive free specimen 13 and the empty halloysite containing specimen 14. In contrast, specimen 16 retained a bright, uniform and well-adhered coating. This indicates that the phosphate was released from encapsulation in an aggressive, corrosive environment over time, thus protecting the nickel plate from corrosion.

Further still, as shown in FIG. 14, significant tarnishing of the silver plate was observed on additive free specimen S1 upon completion of the 168 hour humidity and splash tarnish test, whereas specimen S2 retained a bright, uniform and well-adhered coating. This indicates that the cyanate corrosion inhibitor was released from encapsulation in an aggressive, corrosive environment over time, thus protecting the silver plate from tarnish/corrosion.

REFERENCES

1. Gerhardus H. Koch M P H, Brongers and NGTYPVJHP. Corrosion costs and preventive strategies in the United States. Summ Shute Inst [Internet]. 2002; 1-12. Available from: papers2://publication/uuid/4D469A9D-07D6-4543-B217-3A15873793CF
2. Han K H, Lee S B, Hong I K. Barrel plating process specification for undercoating with copper cyanate. J Ind Eng Chem [Internet]. The Korean Society of Industrial and Engineering Chemistry; 2012; 18 (3): 888-97. Available from: http://dx.doi.org/10.1016/j.jiec.2011.11.066
3. (ECHA) TECA. Chromium trioxide substance information [Internet]. [cited 2018 Apr. 19]. Available from: https://echa.europa.eu/substance-information/-/substanceinfo/100.014.189
4. (ECHA) TECA. Cadmium substance information [Internet]. [cited 2018 Apr. 19]. Available from: https://echa.europa.eu/substance-information/-/substanceinfo/100.028.320
5. Copper Development Association. Benzotriazole: An effective corrosion inhibitor for copper alloys. Work with Copp. 2013;
6. Finšgar M, Milošev I. Inhibition of copper corrosion by 1,2,3-benzotriazole: A review. Corros Sci. 2010; 52 (9): 2737-49.

7. Allam N K, Ashour E a. Promoting effect of low concentration of benzotriazole on the corrosion of Cu10Ni alloy in sulfide polluted salt water. Appl Surf Sci. 2008; 254 (16): 5007-11.
8. Khan P F, Shanthi V, Babu R K, Muralidharan S, Barik R C. Effect of benzotriazole on corrosion inhibition of copper under flow conditions. J Environ Chem Eng [Internet]. Elsevier B. V.; 2015; 3 (1): 10-9. Available from: http://linkinghub.elsevier.com/retrieve/pii/S2213343714002413
9. Bian Y F, Zhai W J, Zhu B Q. 5-methyl-1H-benzotriazole as potential corrosion inhibitor for electrochemical-mechanical planarization of copper. Trans Nonferrous Met Soc China (English Ed [Internet]. The Nonferrous Metals Society of China; 2013; 23 (8): 2431-8. Available from: http://dx.doi.org/10.1016/S1003-6326 (13)62751-X
10. Liu S, Zhong Y, Jiang R, Zeng Z, Feng Z, Xiao R. Corrosion inhibition of zinc in tetra-n-butylammonium bromide aerated aqueous solution by benzotriazole and Na3PO4. Corros Sci [Internet]. Elsevier Ltd; 2011; 53 (2): 746-59. Available from: http://dx.doi.org/10.1016/j.corsci.2010.11.007
11. Gopi D, Govindaraju K M, Collins Arun Prakash V, Angeline Sakila D M, Kavitha L. A study on new benzotriazole derivatives as inhibitors on copper corrosion in ground water. Corros Sci [Internet]. Elsevier Ltd; 2009; 51 (10): 2259-65. Available from: http://dx.doi.org/10.1016/j.corsci.2009.06.008
12. Yu D, Wang J, Hu W, Guo R. Preparation and controlled release behavior of halloysite/2-mercaptobenzothiazole nanocomposite with calcined halloysite as nanocontainer. Mater Des. 2017; 129 (March): 103-10.
13. Zahidah K A, Kakooei S, Ismail M C, Bothi Raja P. Halloysite nanotubes as nanocontainer for smart coating application: A review. Prog Org Coatings [Internet]. Elsevier; 2017; 111 (May): 175-85. Available from: http://dx.doi.org/10.1016/j.porgcoat.2017.05.018
14. Shchukina E, Shchukin D, Grigoriev D. Effect of inhibitor-loaded halloysites and mesoporous silica nanocontainers on corrosion protection of powder coatings. Prog Org Coatings [Internet]. Elsevier B. V.; 2017; 102:60-5. Available from: http://dx.doi.org/10.1016/j.porgcoat.2016.04.031
15. Shchukina E, Grigoriev D, Sviridova T, Shchukin D. Comparative study of the effect of halloysite nanocontainers on autonomic corrosion protection of polyepoxy coatings on steel by salt-spray tests. Prog Org Coatings [Internet]. Elsevier; 2017; 108 (March): 84-9. Available from: http://dx.doi.org/10.1016/j.porgcoat.2017.03.018
16. Yang H, Zhang Y, Ouyang J. Physicochemical Properties of Halloysite [Internet]. 1st ed. Developments in Clay Science. Elsevier Ltd.; 2016. 67-91 p. Available from: http://dx.doi.org/10.1016/B978-0-08-100293-3.00004-2
17. Molaei A, Amadeh A, Yari M, Reza Afshar M. Structure, apatite inducing ability, and corrosion behavior of chitosan/halloysite nanotube coatings prepared by electrophoretic deposition on titanium substrate. Mater Sci Eng C [Internet]. Elsevier B. V.; 2016; 59:740-7. Available from: http://dx.doi.org/10.1016/j.msec.2015.10.073
18. Abdullayev E, Price R, Shchukin D, Lvov Y. Halloysite tubes as nanocontainers for anticorrosion coating with benzotriazole. ACS Appl Mater Interfaces. 2009; 1 (7): 1437-43.
19. Falcon J M, Sawczen T, Aoki I V. Dodecylamine-Loaded Halloysite Nanocontainers for Active Anticorrosion Coatings. Front Mater [Internet]. 2015; 2 (November): 1-13. Available from: http://journal.frontiersin.org/Article/10.3389/fmats.2015.00069/abstract
20. Abdullayev E, Abbasov V, Tursunbayeva A, Portnov V, Ibrahimov H, Mukhtarova G, et al. Self-healing coatings based on halloysite clay polymer composites for protection of copper alloys. ACS Appl Mater Interfaces. 2013; 5 (10): 4464-71.
21. Kim S H, Kim Y C, Lee S, Kim J Y. Evaluation of tensile stress-strain curve of electroplated copper film by characterizing indentation size effect with a single nanoindentation. Met Mater Int. 2017;23 (1): 76-81.

The invention claimed is:

1. A metallic substrate, wherein the surface of the substrate is coated with a coating layer comprising a metal having dispersed in the coating layer a plurality of sealed nanotubes loaded with an anti-corrosion agent wherein said anti-corrosion agent is (1) BTA or a BTA derivative, wherein said BTA derivative is selected from the group consisting of 4-methyl-1H-benzotriazole, S-methyl-1H-benzotriazole, 6-methyl-1H-benzotriazole and 5,6-dimethyl-1H-benzotriazole, 1-(2-pyrrolecarbonyl)benzotriazole (PBTA) and 1 (2-thienylcarbonyl)benzotriazole (TBTA), 1-hydroxymethyl benzotriazole and N,N-dibenzotriazol-1-ylmethylamine; and (ii) a phosphate salt;

wherein said nanotubes are sealed with a material comprising metal ions, wherein said metal ions are ions of a transition metal or an alkaline earth metal; and wherein the phosphate salt comprises a polymeric oxyanion formed from three or more tetrahedral $PO_4$ (phosphate) structural units linked together by sharing oxygen atoms.

2. The metallic substrate according to claim 1, wherein said metal of the coating layer is selected from the group consisting of transition metals, post transition metals and any combination thereof.

3. The metallic substrate according to claim 1, wherein said metal of the coating layer is not, or does not include, chromium or cadmium.

4. The metallic substrate according to claim 1, wherein said metal of the coating layer is selected from the group consisting of copper, zinc, silver, tin, gold, nickel or an alloy comprising one or more thereof.

5. The metallic substrate according to claim 1, wherein said nanotubes are halloysites of formula $Al_2Si_2O_5(OH)_4 \cdot nH_2O)$ where n is 0-2.

6. The metallic substrate according to claim 1, wherein said nanotubes are sealed with a material comprising transition metal ions selected from the group consisting or ions of zinc, silver, gold, nickel and any combination thereof, or wherein said nanotubes are sealed with a material comprising alkaline earth metal ions selected from magnesium, calcium and any combination thereof.

7. The metallic substrate according to claim 5, wherein:

(i) said anti-corrosion agent comprises BTA and said nanotubes are sealed with zinc ions;

(ii) said anti-corrosion agent comprises BTA and said nanotubes are sealed with calcium ions;

(iii) said nanotubes are sealed with zinc ions; OR (iv) said nanotubes are sealed with calcium ions.

8. The metallic substrate according to claim 1, wherein said sealed nanotubes comprise from 1 to 25 wt % of said anti-corrosion agent with respect to the total weight of the unloaded nanotubes.

9. The metallic substrate according to claim 1, wherein said nanotubes are present in the coating layer in an amount from 0.5 to 8% by weight with respect of the total weight of the coating layer.

10. The metallic substrate according to claim 1, wherein said substrate is selected from the group consisting of iron, steel, mild steel, aluminium and aluminium alloys, wherein said alloys further comprise one or more metal selected from copper, magnesium, manganese, silicon, tin, nickel, silver, gold and zinc.

11. The metallic substrate according to claim 1, wherein said substrate is steel or mild steel.

12. The metallic substrate according to claim 1, wherein said coating layer is from 1 to 100 μm thick.

13. The metallic substrate according to claim 1, wherein:

(i) said anti-corrosion agent comprises BTA and said nanotubes are sealed with zinc ions;

(ii) said anti-corrosion agent comprises BTA and said nanotubes are sealed with calcium ions;

(iii) said nanotubes are sealed with zinc ions; or (iv) said nanotubes are scaled with calcium ions.

14. A process for the preparation of a coated metallic substrate according to claim 1, wherein:

(A) said process is an electroplating process, said process comprising the steps of:

i) providing an electroplating solution comprising transition metal and/or post transition metal ions and a plurality of sealed nanotubes loaded with an anti-corrosion agent in a vessel to contain said electroplating solution, an anode immersed in the electroplating solution, a metallic substrate immersed in the plating solution and which is in electric contact with a cathode, and a power source in electric contact with the anode and the cathode;

ii) applying an electric current from the power source for a time such that the surface of the substrate is coated with a metallic layer; and iii) removing the coated metallic substrate from the electroplating solution;

or (B) said process in an electroless plating process, said process comprising the steps of:

i) providing an electroless plating solution comprising a reducing agent, transition metal and/or post transition metal ions, and a plurality of sealed nanotubes loaded with an anti-corrosion agent in a vessel to contain said plating solution;

ii) immersing a metallic substrate in said plating solution for a time such that the surface of the metallic substrate is coated with a metallic layer; and iii) removing the coated metallic substrate from the electroless plating solution.

15. The process according to claim 14, wherein said metallic substrate is selected from the group consisting of iron, steel, mild steel, aluminium and aluminium alloys, wherein said alloys further comprise one or more metals selected from copper, magnesium, manganese, silicon, tin, nickel, silver, gold and zinc.

16. The process according to claim 14, wherein said process is an electroplating process and wherein said anode comprises a metal selected from the group consisting of copper, zinc, silver, tin, gold, nickel, or an alloy comprising one or more thereof.

* * * * *